United States Patent
Paulraj et al.

(10) Patent No.: US 11,496,595 B2
(45) Date of Patent: Nov. 8, 2022

(54) PROXY MANAGEMENT CONTROLLER SYSTEM

(71) Applicant: Dell Products L.P., Round Rock, TX (US)

(72) Inventors: Deepaganesh Paulraj, Bangalore (IN); Ankit Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/165,026

(22) Filed: Feb. 2, 2021

(65) Prior Publication Data
US 2022/0247830 A1    Aug. 4, 2022

(51) Int. Cl.
| | |
|---|---|
| G06F 15/16 | (2006.01) |
| H04L 67/561 | (2022.01) |
| H04L 67/00 | (2022.01) |
| H04L 67/125 | (2022.01) |
| H04L 67/566 | (2022.01) |

(52) U.S. Cl.
CPC .......... *H04L 67/561* (2022.05); *H04L 67/125* (2013.01); *H04L 67/34* (2013.01); *H04L 67/566* (2022.05)

(58) Field of Classification Search
CPC . H04L 67/2804; H04L 67/34; H04L 67/2833; H04L 67/125
USPC ................ 709/203, 201, 208, 209, 219–221; 455/61, 557, 338, 528; 726/3, 6, 12
See application file for complete search history.

(56) References Cited

U.S. PATENT DOCUMENTS

| | | | | |
|---|---|---|---|---|
| 6,826,387 | B1 * | 11/2004 | Kammer ................. | H04L 29/06 370/338 |
| 7,873,650 | B1 * | 1/2011 | Chapman ............ | G06F 16/9024 707/764 |
| 7,940,911 | B2 * | 5/2011 | Berranger ............ | H04Q 3/0025 379/220.01 |
| 8,266,234 | B1 * | 9/2012 | Chapman ............ | H04L 12/1877 709/208 |
| 2008/0134309 | A1 * | 6/2008 | Qin ....................... | H04N 21/632 726/6 |

(Continued)

FOREIGN PATENT DOCUMENTS

JP          2013117946 A  *  6/2013  ........... H04L 9/0816

*Primary Examiner* — Thuong Nguyen
(74) *Attorney, Agent, or Firm* — Joseph Mencher

(57) ABSTRACT

A proxy management controller system includes a first management controller device in a first server device, a second management controller device in a second server device, and a proxy management controller manager subsystem coupled to the first and second management controller device. The first management controller device receives an instruction from the proxy management controller manager subsystem to provide a proxy management controller for the second management controller device, and creates a proxy management controller virtual container for the second management controller device. The first management controller device then receives raw data collected by the second management controller device from the second server device, stores the raw data in the proxy management controller virtual container, and converts the raw data to formatted data. The first management controller device then uses the formatted data to perform at least one management operation that is associated with the second management controller device.

20 Claims, 23 Drawing Sheets

(56) References Cited

U.S. PATENT DOCUMENTS

| | | | | |
|---|---|---|---|---|
| 2010/0017854 | A1* | 1/2010 | Takeishi | G06F 21/31 |
| | | | | 726/3 |
| 2010/0150140 | A1* | 6/2010 | Britsch | H04L 65/1016 |
| | | | | 370/352 |
| 2010/0284028 | A1* | 11/2010 | Takeuchi | G03G 15/5087 |
| | | | | 358/1.6 |
| 2010/0325248 | A1* | 12/2010 | Camarillo Gonzalez | |
| | | | | H04L 67/16 |
| | | | | 709/220 |
| 2011/0131299 | A1* | 6/2011 | Sardary | G11B 27/034 |
| | | | | 709/219 |
| 2011/0307951 | A1* | 12/2011 | Yermakov | G06F 21/563 |
| | | | | 726/12 |
| 2012/0221322 | A1* | 8/2012 | Maekawa | G06F 16/972 |
| | | | | 704/3 |
| 2013/0042056 | A1* | 2/2013 | Shats | G06F 12/0871 |
| | | | | 711/E12.008 |
| 2013/0124598 | A1* | 5/2013 | Lakritz | G06F 40/58 |
| | | | | 709/201 |
| 2013/0151679 | A1* | 6/2013 | Banerjee | H04L 67/1095 |
| | | | | 709/221 |
| 2013/0298031 | A1* | 11/2013 | Kanda | H04N 7/152 |
| | | | | 715/733 |
| 2014/0171097 | A1* | 6/2014 | Fischer | G01S 5/0242 |
| | | | | 455/456.1 |
| 2016/0212227 | A1* | 7/2016 | Berarducci | H04L 67/16 |
| 2020/0174851 | A1* | 6/2020 | Manula | H04L 67/10 |
| 2021/0157724 | A1* | 5/2021 | Chen | G06F 3/0604 |

* cited by examiner

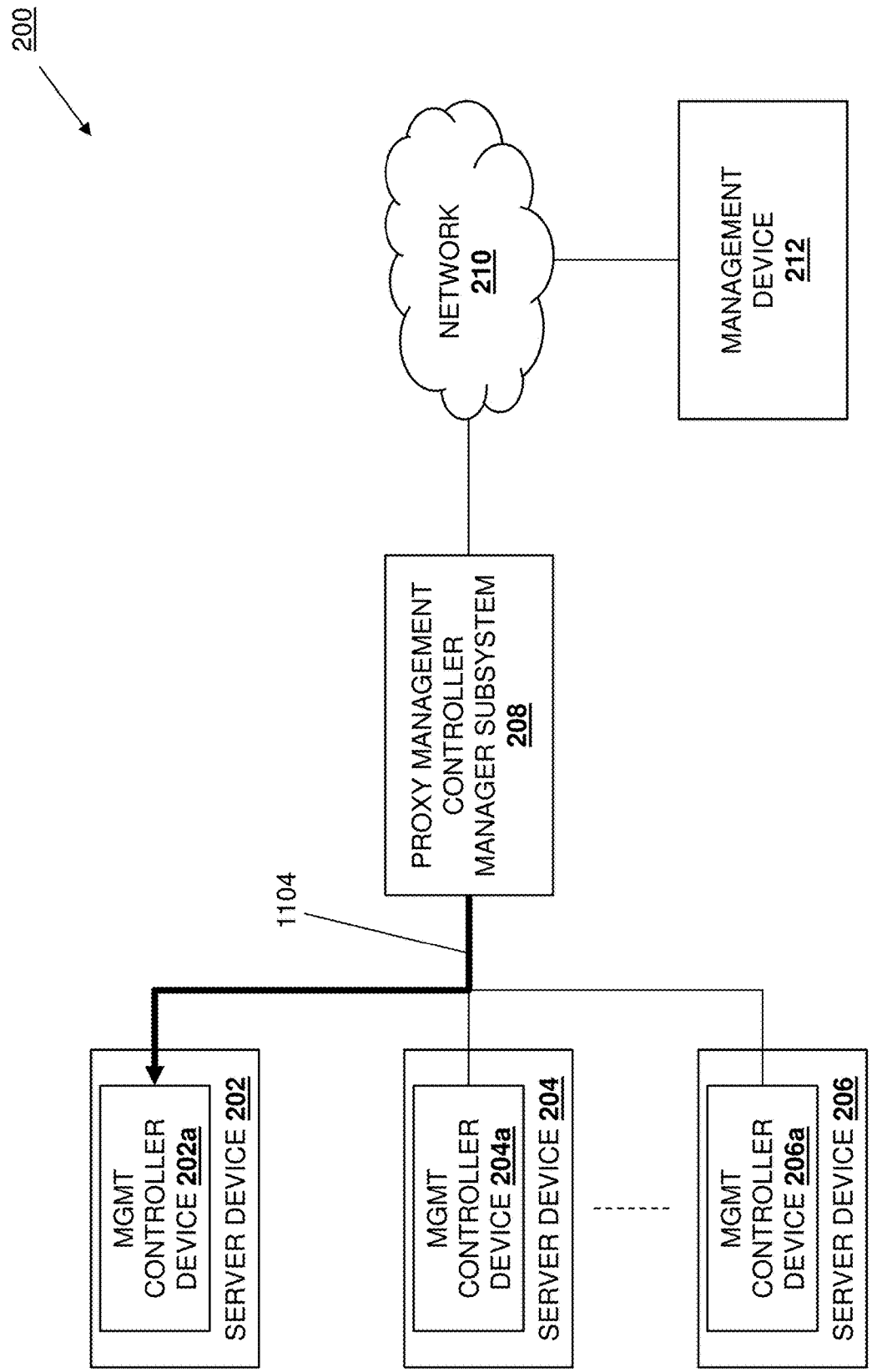

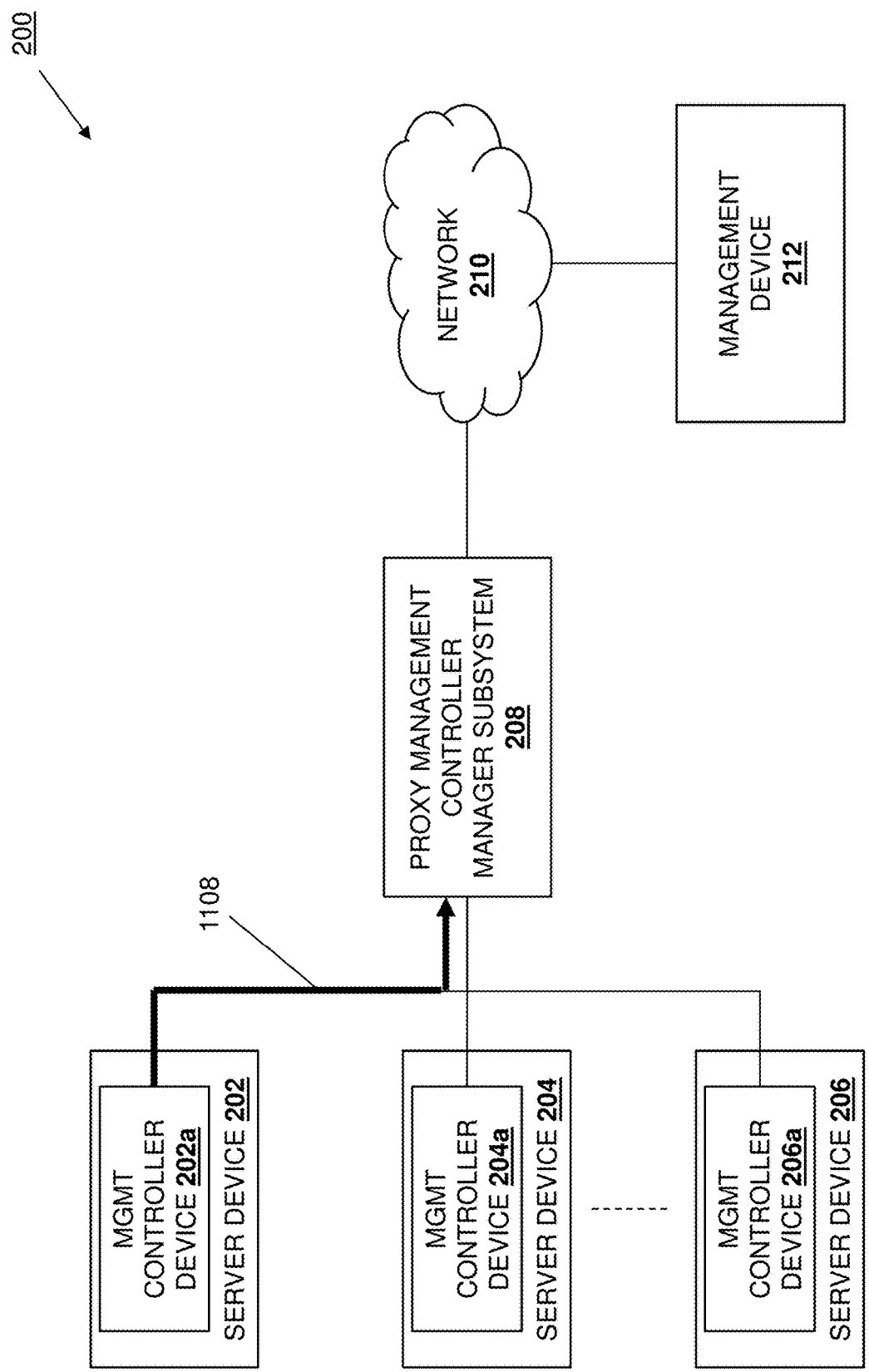

PROXY MANAGEMENT CONTROLLER SYSTEM

BACKGROUND

The present disclosure relates generally to information handling systems, and more particularly to providing proxy management controllers for management controller devices utilized in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, may sometimes include management controller devices for use in managing the server device. For example, the integrated DELL® Remote Access Controller (iDRAC) available from DELL® Inc. of Round Rock, Tex., United States, and/or other Baseboard Management Controllers (BMCs) known in the art, may be provided in server devices in order to provide an out-of-band management platform that may include its own processing system, memory system, network connection, access to the system bus, and/or other components/component configurations that allow for the performance of power management operations, virtual media access operations, remote console capabilities, and/or other management controller operations known in the art. However, such management controller devices are typically tightly coupled to the server device in which they are located, and thus are only configured to manage that server device and its components, which can raise some issues.

For example, service(s) provided by management controllers may become unavailable due to, for example, software "bugs" that may cause those services to continually restart, the addition of components to their server device that those service(s) are not configured to support, and/or other management controller service unavailability situations known in the art. As will be appreciated by one of skill in the art in possession of the present disclosure, the unavailability of service(s) provided by a management controller can prevent the performance of basic server device management operations such as, for example, thermal management operations, power management operations, and/or other server device management operations known in the art. Furthermore, the unavailability of service(s) provided by a management controller can prevent the conversion of raw data (e.g., collected using sensors in the server device) to a presentable format for display to a user, and/or can prevent the display of data that has been converted into a presentable format from raw data to a network administrator or other user.

Further still, the unavailability of service(s) provided by a management controller can prevent the generation of management responses to management requests provided via external interface components (e.g., REDFISH® interfaces, Graphical User Interfaces (GUIs), Remote Access Controller Administration (RACADM) interfaces, etc.), which can prevent a network administrator or other user from performing system management activities such as remote power-on activities, thermal control activities, and/or other management activities known in the art. As such, while management controllers may be partially functional (e.g., with the ability to collect the raw data generated by their server devices discussed above), the unavailability of a service provided by the management controller may prevent the performance of many management activities via those management controllers. The conventional solution to unavailable management controllers is to restart those management controllers, but one of skill in the art in possession of the present disclosure will appreciate that such solutions will not remedy the service unavailability discussed above.

Accordingly, it would be desirable to provide a management controller system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a management controller engine that is configured to: receive, from a proxy management controller manager subsystem, an instruction to provide a proxy management controller for a management controller device in a server device; create a proxy management controller virtual container that is associated with the management controller device; receive, from the management controller device, raw data collected by the management controller device from the server device; store the raw data in the proxy management controller virtual container; convert the raw data that is stored in the proxy management controller virtual container to formatted data; and perform, using the formatted data, at least one management operation that is associated with the management controller device.

BRIEF DESCRIPTION OF THE DRAWINGS

FIG. 11C is a schematic view illustrating an embodiment of the networked system of FIG. 2 operating during the method of FIG. 5.

FIG. 11E is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
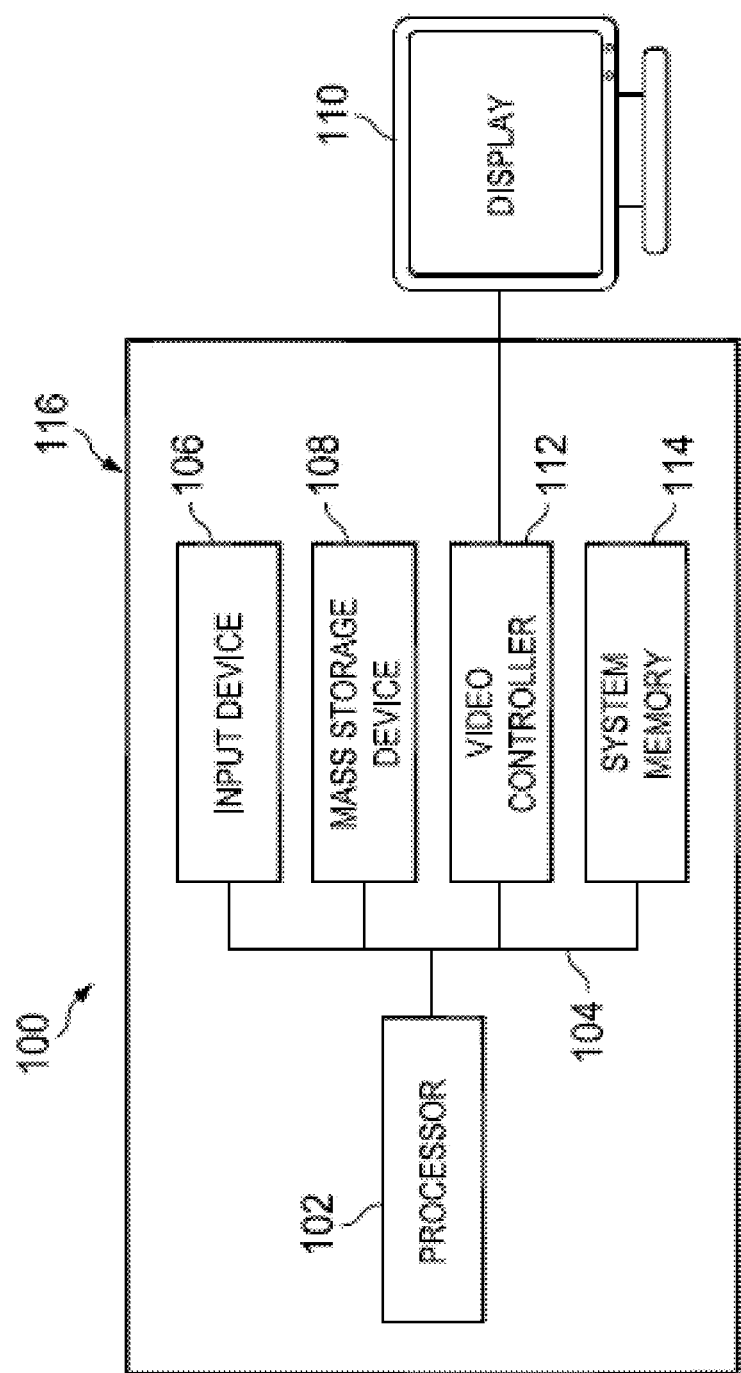
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
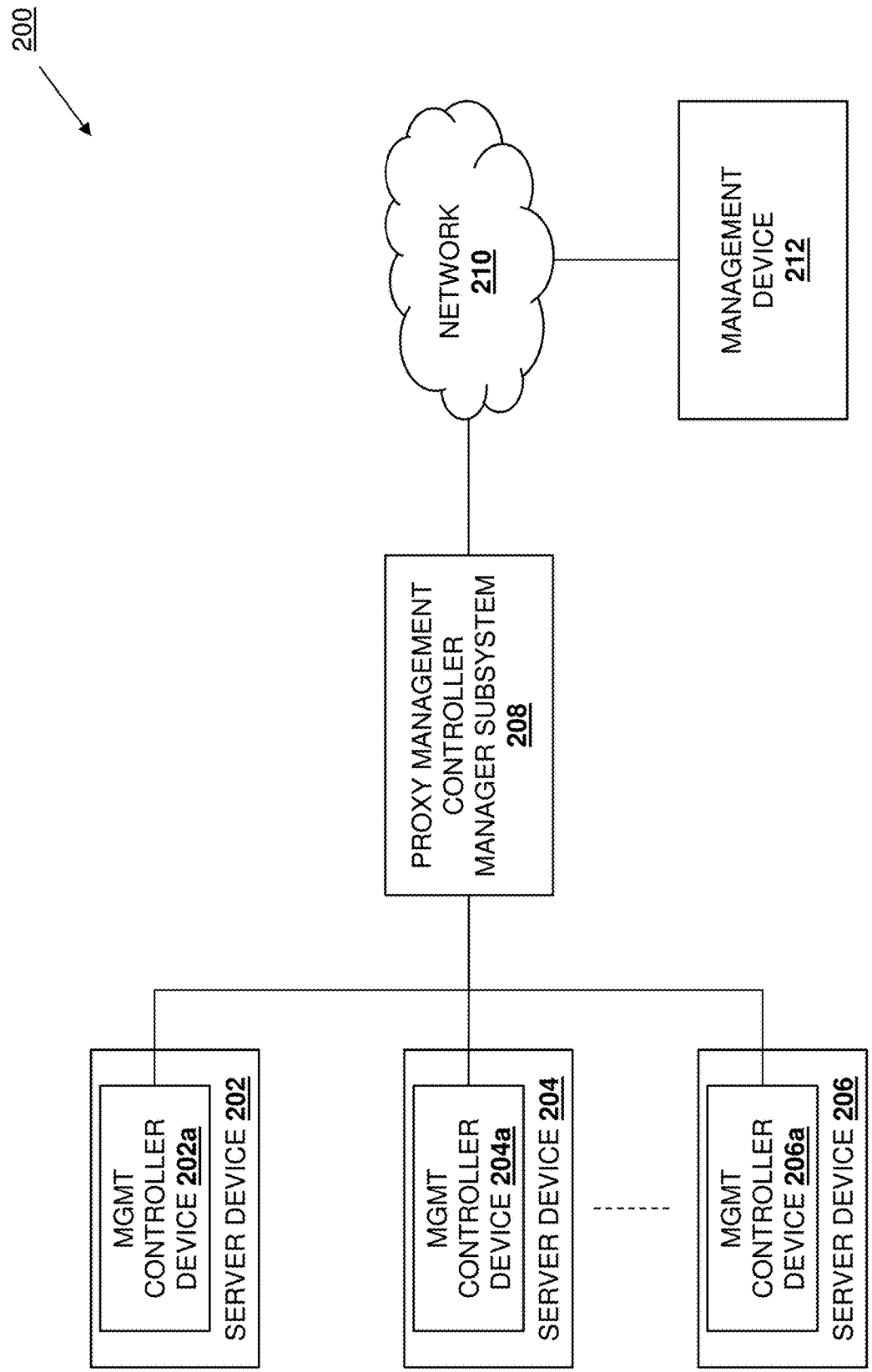
FIG. 2 is a schematic view illustrating an embodiment of a networked system that may provide the proxy management controller system of the present disclosure.

Referring now to FIG. 2, an embodiment of a networked system 200 is illustrated that may provide the proxy management controller system of the present disclosure. In the illustrated embodiment, the networked system 200 includes a plurality of server devices 202, 204, and up to 206. In an embodiment, any or all of the server devices 202-206 may be provided by the IHS 100 discussed above with reference to FIG. 1, and/or may include some or all of the components of the IHS 100. However, while illustrated and discussed as being provided by server devices, one of skill in the art in possession of the present disclosure will recognize that the server devices 202-206 provided in the networked system 200 may be provided by other computing devices that may be configured to operate similarly as the server devices 202-206 discussed below.

In the illustrated embodiment, each of the server devices 202, 204, and up to 206 includes a respective management controller device 202a, 204a, and up to 206a. In an embodiment, any or all of the management controller devices 202a-206a may be provided by the IHS 100 discussed above with reference to FIG. 1, and/or may include some or all of the components of the IHS 100, and in specific examples may be provided by the iDRAC® device discussed above, other BMC devices, and/or other management controller devices that would be apparent to one of skill in the art in possession of the present disclosure. However, while illustrated and discussed as being provided by particular management controller devices, one of skill in the art in possession of the present disclosure will recognize that the management controller devices 202a-206a provided in server devices 202/206 in the networked system 200 may be provided by other management devices that may be configured to operate similarly as the management controller devices 202a-206a discussed below.

In the illustrated embodiment, a proxy management controller manager subsystem 208 is coupled to each of the management controller devices 202a-206a in the server devices 202 (e.g., via a respective Peripheral Component Interconnect express (PCIe) bus to each management controller device 202a-206a). In an embodiment, the proxy management controller manager subsystem 208 may be provided by the IHS 100 discussed above with reference to FIG. 1, and/or may include some or all of the components of the IHS 100, and in the specific examples below is discussed as being provided by a multi-host Smart Network Interface Controller (SmartNIC) device. For example, the proxy management controller manager subsystem 208 may be provided by a server device including a multi-host SmartNIC device that provides the proxy management controller manager functionality discussed herein.

In a specific example, a conventional multi-host smartNIC device in a "primary" server device may be configured to connect with up to seven neighboring "secondary" server devices, with that multi-host smartNIC device providing for inter-management-controller-device communications via a dedicated communication channel (e.g., a Network Controller-Sideband Interface (NC-SI) passthrough communication channel that utilizes a Management Component Transport Protocol (MCTP) with Peripheral Component Interconnect express (PCIe) Vendor Defined Messages (VDMs)). However, one of skill in the art in possession of the present disclosure will appreciate that multi-host SmartNIC devices may be "daisy-chained" in order to extend the proxy management controller system functionality discussed below to additional server devices.

However, as discussed in further detail below, in other embodiments the proxy management controller manager subsystem 208 may be provided by a management controller device similar to the management controller devices 202a-206a discussed below. For example, the proxy management controller manager subsystem 208 may be provided by a server device including a management controller device that provides the proxy management controller manager functionality discussed herein. As such, the networked system 200 may include a plurality of server devices, and one of those server devices and its multi-host SmartNIC device or management controller device may be configured to provide the proxy management controller manager subsystem 208 and its associated functionality discussed below. Furthermore, while a few specific examples are provided, one of skill in the art in possession of the present disclosure will appreciate that a variety of subsystems may be utilized to provide the proxy management controller manager functionality described herein while remaining within the scope of the present disclosure as well.

In the illustrated embodiment, the proxy management controller manager subsystem 208 is coupled to a network 210 that may be provided by a Local Area Network (LAN), the Internet, combinations thereof, and/or a variety of other networks that would be apparent to one of skill in the art in possession of the present disclosure. A management device 212 is also couple to the network 210. In an embodiment, the management device 212 may be provided by the IHS 100 discussed above with reference to FIG. 1, and/or may include some or all of the components of the IHS 100, and in specific examples may be provided by a desktop computing device, a laptop/notebook computing device, a tablet computing device, a mobile phone, and/or other management devices that one of skill in the art in possession of the present disclosure will recognize allow a network administrator or other user to perform the management operations discussed below. However, while a specific networked system 200 has been illustrated and described, one of skill in the art in possession of the present disclosure will recognize that the proxy management controller system of the present disclosure may include a variety of components and component configurations while remaining within the scope of the present disclosure as well.

Figure 3:
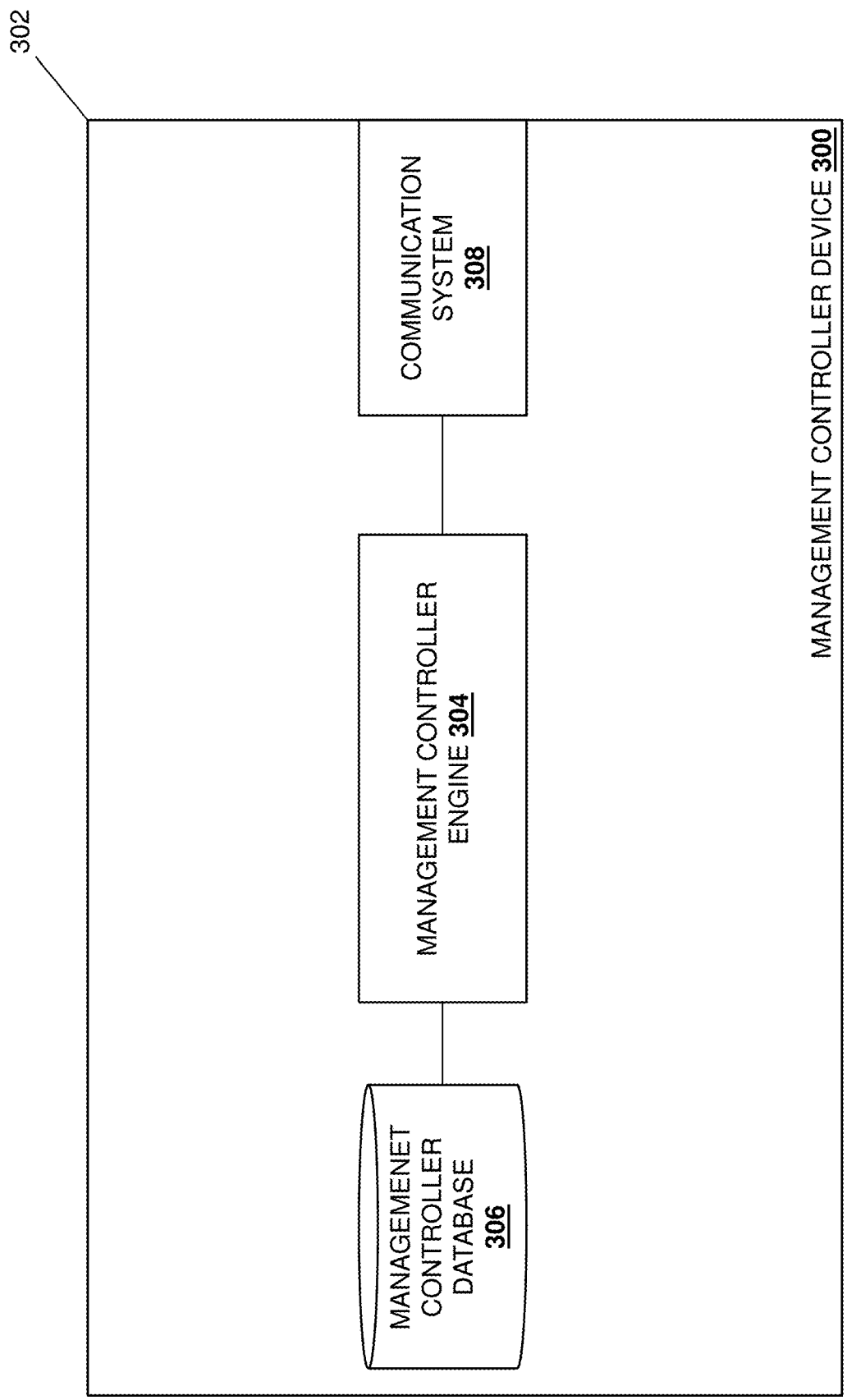
FIG. 3 is a schematic view illustrating an embodiment of a management controller device that may be provided in a server device in the networked system of FIG. 2.

Referring now to FIG. 3, an embodiment of a management controller device 300 is illustrated that may provide any or each of the management controller devices 202a-206a discussed above with reference to FIG. 2. As such, the management controller device 300 may be provided by the IHS 100 discussed above with reference to FIG. 1 and/or may include some or all of the components of the IHS 100, and in specific examples may be provided by the iDRAC® device discussed above, other BMC devices, and/or other management controller devices that would be apparent to one of skill in the art in possession of the present disclosure. However, while illustrated and discussed as being provided by particular management controller devices, one of skill in the art in possession of the present disclosure will recognize that the management controller device 300 may be provided by other management controller devices that may be configured to operate similarly as the management controller device 300 discussed below. In the illustrated embodiment, the management controller device 300 includes a chassis 302 (e.g., a circuit board) that supports the components of the management controller device 300, only some of which are illustrated and discussed below. For example, the chassis 302 may support a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management controller engine 304 that is configured to perform the functionality of the management controller engines and/or management controller devices discussed below.

The chassis 302 may also house a storage system (not illustrated, but which may include the storage 108 discussed above with reference to FIG. 1) that is coupled to the management controller engine 304 (e.g., via a coupling between the storage system and the processing system) and that includes a management controller database 306 that is configured to store any of the information utilized by the management controller engine 304 discussed below. The chassis 302 may also house a communication system 308 that is coupled to the management controller engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific management controller device 300 has been illustrated, one of skill in the art in possession of the present disclosure will recognize that management controller devices (or other devices operating according to the teachings of the present disclosure in a manner similar to that described below for the management controller device 300) may include a variety of components and/or component configurations for providing conventional management controller device functionality, as well as the functionality discussed below, while remaining within the scope of the present disclosure as well.

Figure 4:
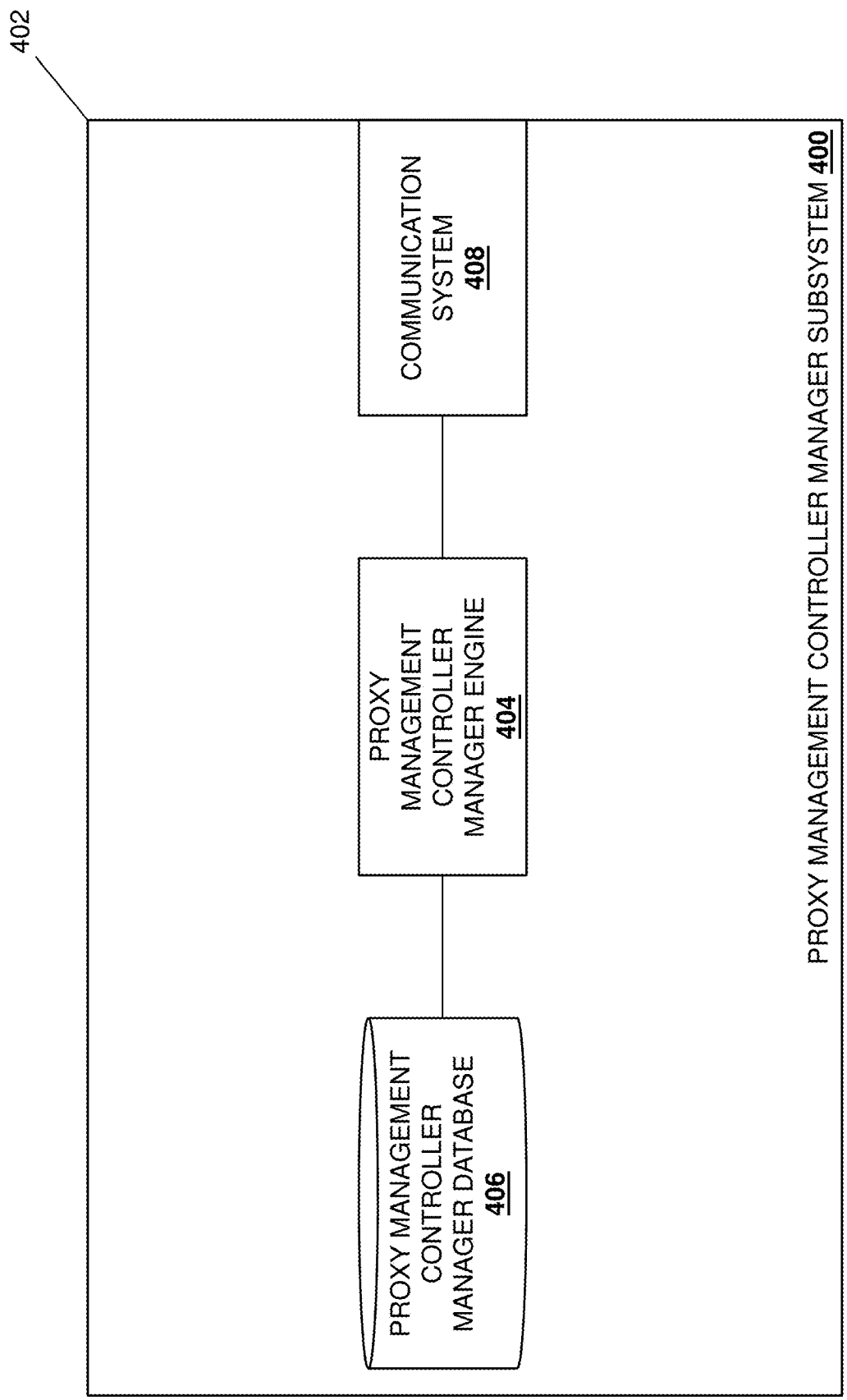
FIG. 4 is a schematic view illustrating an embodiment of a proxy management controller manager subsystem that may be provided in the networked system of FIG. 2.

Referring now to FIG. 4, an embodiment of a proxy management controller manager subsystem 400 is illustrated that may provide the proxy management controller manager subsystem 208 discussed above with reference to FIG. 2. As such, the proxy management controller manager subsystem 400 may be provided by the IHS 100 discussed above with reference to FIG. 1 and/or may include some or all of the components of the IHS 100, and in the specific examples provided below is discussed as being provided by a multi-host SmartNIC device. However, while illustrated and discussed as being provided by a multi-host SmartNIC device, in other embodiments the proxy management controller manager subsystem 400 may be provided by a management controller device and/or a variety of subsystems that are configured to provide the proxy management controller manager functionality described herein while remaining within the scope of the present disclosure as well.

In the illustrated embodiment, the proxy management controller manager device 400 includes a chassis 402 (e.g., a circuit board) that houses the components of the management controller device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a proxy management controller manager engine 404 that is configured to perform the functionality of the proxy management controller manager engines and/or proxy management controller manager subsystems discussed below.

The chassis 402 may also house a storage system (not illustrated, but which may include the storage 108 discussed above with reference to FIG. 1) that is coupled to the proxy management controller manager engine 404 (e.g., via a coupling between the storage system and the processing system) and that includes a proxy management controller manager database 406 that is configured to store any of the information utilized by the proxy management controller manager engine 404 discussed below. The chassis 302 may also house a communication system 408 that is coupled to the proxy management controller manager engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific proxy management controller manager subsystem 400 has been illustrated and described, one of skill in the art in possession of the present disclosure will recognize that proxy management controller manager subsystems (or other devices operating according to the teachings of the present disclosure in a manner similar to that described below for the proxy management controller manager subsystem 400) may include a variety of components and/or component configurations for providing conventional management controller manager subsystem functionality, as well as the functionality discussed below, while remaining within the scope of the present disclosure as well.

Figure 5:
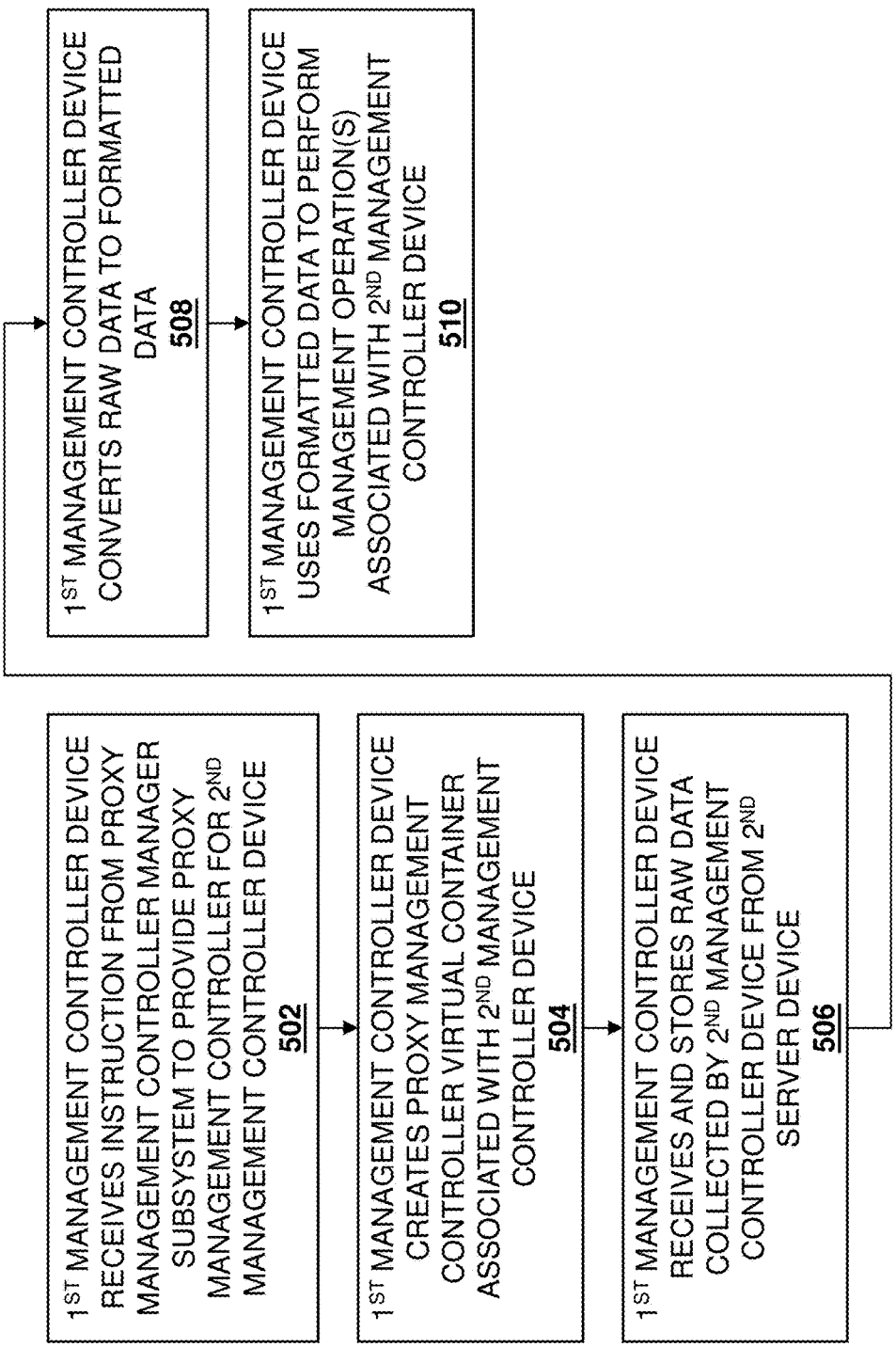
FIG. 5 is a flow chart illustrating an embodiment of a method for providing a proxy management controller.

Referring now to FIG. 5, an embodiment of a method 500 for providing a proxy management controller is illustrated. As discussed below, the systems and methods of the present disclosure provide for the use of a neighboring management controller device in a neighboring server device to operate as a virtual/proxy management controller for another management controller device in another server device that has one or more of its services become unavailable in order to perform those service(s) on behalf of that management controller device. For example, the proxy management controller system of the present disclosure may include a first management controller device in a first server device, a second management controller device in a second server device, and a proxy management controller manager subsystem coupled to the first and second management controller device. The first management controller device receives an instruction from the proxy management controller manager subsystem to provide a proxy management controller for the second management controller device, and creates a proxy management controller virtual container associated with the second management controller device. The first management controller device then receives raw data collected by the second management controller device from the second server device, stores the raw data in the proxy management controller virtual container, and converts the raw data to formatted data. The first management controller device then uses the formatted data to perform at least one management operation that is associated with the second management controller device. As such, management controller devices with unavailable service(s) but partial functionality (e.g., with the ability to collect raw data from their server devices) may have management activities performed by neighboring management controller devices in order to ensure proper operation of their associated server devices.

In an embodiment, during or prior to the method 500, the proxy management controller manager subsystem 208 provided by a multi-host SmartNIC device may be connected to the server devices 202-206 and configured to provide inter-management-controller-device communications via an NC-SI passthrough communication channel that utilizes a MCTP with PCIe VDMs. For example, the proxy management controller manager engine 404 in the proxy management controller manager subsystem 208 may be provided by a module or other application that is configured to perform the proxy management controller manager functionality discussed below. In a specific example, a management controller device in the server device that includes the proxy management controller manager subsystem 208 (provided by a multi-host SmartNIC device) may deploy a proxy management controller manager module in the proxy management controller manager subsystem 208 as an application running on that proxy management controller manager subsystem 208. However, while a specific embodiment of the proxy management controller manager subsystem 208 is illustrated and described, one of skill in the art in possession of the present disclosure will recognize that the functionality of the proxy management controller manager subsystem 208 may be provided in other manners that will fall within the scope of the present disclosure as well.

The method 500 begins at block 502 where a first management controller device receives an instruction from a proxy management controller manager subsystem to provide a proxy management controller for a second management controller device. In some embodiment, the instruction from the proxy management controller manager subsystem 208 at block 502 may be generated and transmitted in response to determining an unavailability of service(s) in a management controller device 202a-206a in the networked system 200, discussed in further detail below. However, one of skill in the art in possession of the present disclosure will appreciate that the instruction from the proxy management controller manager subsystem 208 at block 502 may be generated and transmitted without determining any unavailability of service(s) in a management controller device 202a-206a in the networked system 200, and instead may be generated and transmitted to provide a proxy management controller for any management controller device 202a-206a in the networked system 200 in order to provide redundancy (i.e., that proxy management controller may take over management operations in the event of the unavailability of service(s) in the management controller device for which is was provided). As such, while several examples are provided of service unavailability that cause the instruction from the proxy management controller manager subsystem 208 to be generated and transmitted at block 502, one of skill in the art in possession of the present disclosure will appreciate that no service unavailability in a management controller device is necessary in order to provide a proxy management controller for a management controller device as described below.

In one example of a service unavailability in a management controller device that causes the proxy management controller manager subsystem 208 to send the instruction to provide a proxy management controller for that management controller device, the management controller engine 304 in the management controller devices 202a-206a/300 may be configured to periodically communicate (e.g., via their communication systems 308) with the proxy management controller manager engine 404 in the proxy management controller manager subsystem 208/400. For example, the management controller engine 304 in the management controller devices 202a-206a/300 may be configured to transmit "heartbeat" messages via their respective PCIe communication channels and the NC-SI passthrough communication channel discussed above (e.g., utilizing a MCTP with PCIe VDMs), and the proxy management controller manager engine 404 in the proxy management controller manager subsystem 208/400 may monitor for the receipt of those "heartbeat" messages.

As will be appreciated by one of skill in the art in possession of the present disclosure, service failures in a management controller device (e.g., an internal module failure that results in a continuous watchdog timer expiration) may cause that management controller device to stop sending the "heartbeat" messages discussed above. Thus, in the event a "heartbeat" message is not received from a management controller device within some time period (e.g., 5 minutes in the specific example provided below), the proxy management controller manager engine 404 in the proxy management controller manager subsystem 208/400 may determine that a service unavailability has occurred in that management controller device, and at block 502 the proxy management controller manager engine 404 in the proxy management controller manager subsystem 208/400 may generate and transmit an instruction to another management controller device to provide a proxy management controller for that management controller device.

In another example of a service unavailability in a management controller device that causes the proxy management controller manager subsystem 208 to send the instruction to provide a proxy management controller for that management controller device, a network administrator or other user may utilize the management device 212 in order to transmit a management request (e.g., a REDFISH® get/patch Uniform Resource Locator (URI)) that is destined for a management controller device via the network 210 and to the proxy management controller manager subsystem 208. In response to receiving such a management request destined for a management controller device, the proxy management controller manager engine 404 in the proxy management controller manager subsystem 208/400 may forward that management request to that management controller device.

As will be appreciated by one of skill in the art in possession of the present disclosure, service failures in a management controller device may prevent that management controller device from processing that management request and/or sending a management response that is destined for the management device 212 via the proxy management controller manager subsystem 208. Thus, in the event the proxy management controller manager engine 404 in the proxy management controller manager subsystem 208/400 does not receive a management response from a management controller device to which it forwarded a management request, the proxy management controller manager engine 404 in the proxy management controller manager subsystem 208/400 may determine that a service unavailability has occurred in that management controller device, and at block 502 the proxy management controller manager engine 404 in the proxy management controller manager subsystem 208/400 may generate and transmit an instruction to another management controller device to provide a proxy management controller for that management controller device.

However, while two specific service unavailability situations associated with a management controller device have been described that may cause the proxy management controller manager engine 404 in the proxy management controller manager subsystem 208/400 to transmit the instruction to provide a proxy management controller for that management controller device to another management controller device, one of skill in the art in possession of the present disclosure will appreciate that service unavailability in a management controller device may be identified in a variety of manners that will fall within the scope of the present disclosure, and the sending of an instruction to provide a proxy management controller for a management controller device with an unavailable service may be performed in response to the detection of a variety of service unavailability's detected in a variety of manners while remaining within the scope of the present disclosure as well.

In some embodiments, in response to determining a service unavailability in a management controller device, the proxy management controller manager engine 404 in the proxy management controller manager subsystem 208/400 may identify another management controller device that is currently configured to perform the unavailable service(s), and may then transmit the instruction to provide the proxy management controller to that management controller device. In other embodiments, in response to determining a service unavailability in a management controller device, the proxy management controller manager engine 404 in the proxy management controller manager subsystem 208/400 may configure another management controller device to perform the unavailable service(s) (e.g., via the retrieval and provisioning of software on that management controller device), and may then transmit the instruction to provide the proxy management controller to that management controller device. However, while a few specific examples are provided, one of skill in the art in possession of the present disclosure will appreciate that the management controller device that provides the proxy management controller for the management controller device with unavailable service(s) as discussed below may be selected and/or configured to perform those unavailable service(s) in a variety of manners that will fall within the scope of the present disclosure as well.

Figure 6A:
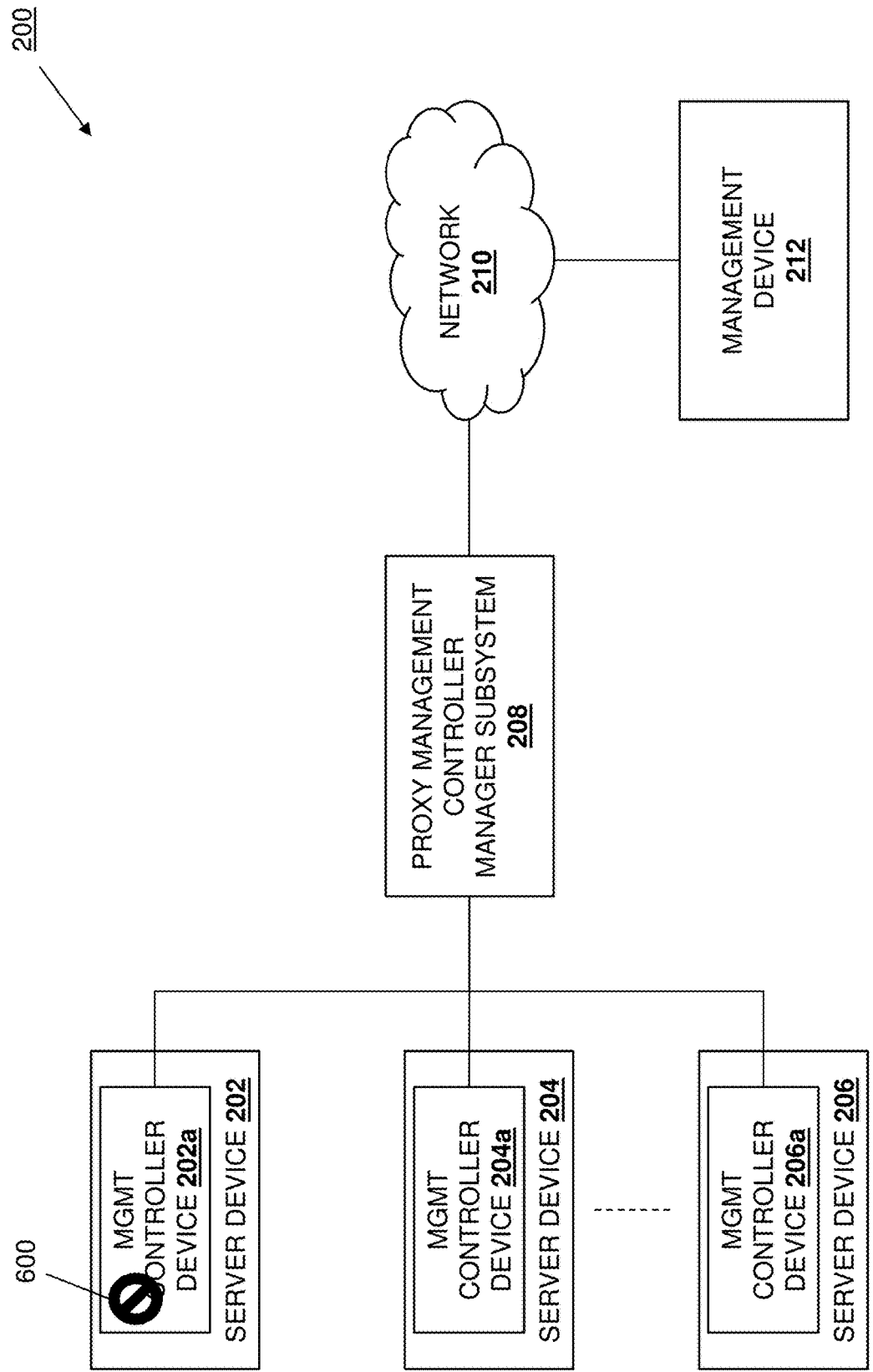
FIG. 6A is a schematic view illustrating an embodiment of the networked system of FIG. 2 operating during the method of FIG. 5.
Figure 6B:
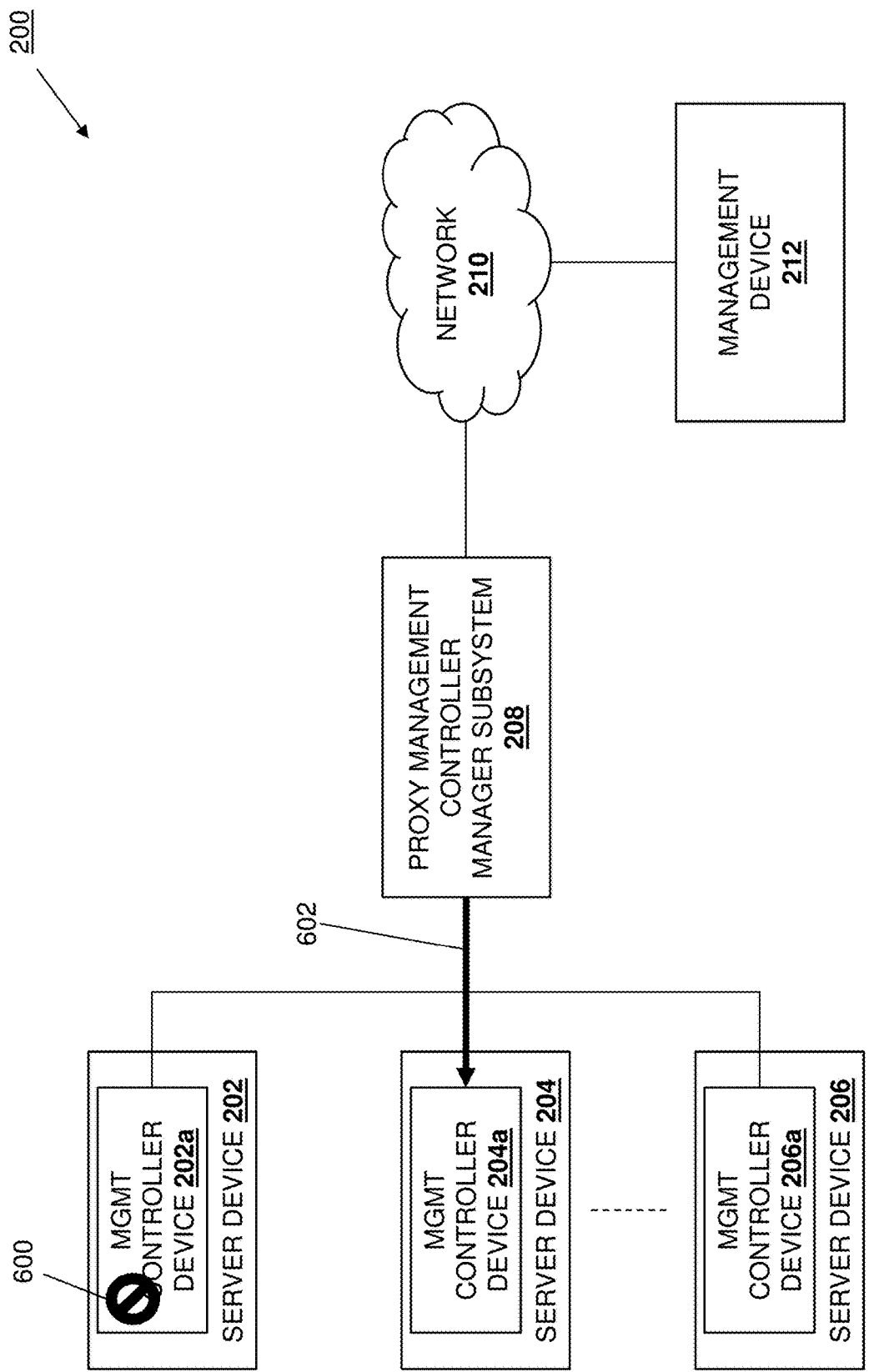
FIG. 6B is a schematic view illustrating an embodiment of the networked system of FIG. 2 operating during the method of FIG. 5.

As such, with reference to FIGS. 6A and 6B, the proxy management controller manager engine 404 in the proxy management controller manager subsystem 208/400 may determine that a service unavailability has occurred in the management controller device 202a in the server device 202 (as indicated by element 600 in FIGS. 6A and 6B) and, in response, may perform proxy management controller instruction operations 602 that include transmitting a proxy management controller instruction to the management controller device 204a in the server device 204. As such, at block 502, the management controller engine 304 in the management controller device 204a/300 included in the server device 204 may receive the instruction to provide a proxy management controller for the management controller device 202a included in the server device 202 from the proxy management controller manager subsystem 208 (e.g., via its communication system 308).

In some embodiments, the proxy management controller manager engine 404 in the proxy management controller manager subsystem 208/400 may maintain a table (e.g., in the proxy management controller manager database 406) that maps any management controller device with unavailable service(s) to the management controller device that provide it a proxy management controller. Continuing with the example above in which the management controller device 204a/300 included in the server device 204 has been selected to provide the proxy management controller for the management controller device 202a/300 included in the server device 202, the following mapping entry may be stored by the proxy management controller manager engine 404 in the proxy management controller manager subsystem 208/400 in a proxy management controller mapping table in the proxy management controller manager database 406:

heartbeat recovery time for the management controller device 202a/300 that is included in the server device 202 (e.g., 5 minutes, after which an associated service in that management controller device 202a/300 will be considered unavailable), and an "ACTIVE" status for the current proxy management controller provided by the management controller device 204a/300 that is included in the server device 204 (e.g., that indicates that the proxy management controller is currently being actively provided). However, while a specific example is provided, one of skill in the art in possession of the present disclosure will recognize that management controller devices with unavailable service(s) may be mapped to the management controller device that provide them a proxy management controller in a variety of manners that will fall within the scope of the present disclosure as well.

As such, while only a single management controller device with unavailable service(s) is illustrated and discussed above as being provided a proxy management controller by another management controller device, one of skill in the art in possession of the present disclosure will appreciate that any number of management controller devices with unavailable services may be provided proxy management controllers by other managements controller devices, with each management controller device with unavailable service(s) mapped to the management controller device that provides its proxy management controller device in a proxy management controller mapping table like that described above. Furthermore, in the event proxy management controllers are provided for management controller devices for redundancy (and without the need for service unavailability in those management controller devices as discussed above), one of skill in the art in possession of the present disclosure will recognize the proxy management controller mapping table may be provided similarly as discussed above.

The method 500 then proceeds to block 504 where the first management controller device creates a proxy management controller virtual container associated with the second management controller device. In an embodiment, at block 504 and with reference to FIG. 7, the management controller engine 304 in the management controller device 204a/300 included in the server device 204 may operate to provide a proxy management controller subsystem 700 using the management controller database 306. For example, at block 504, the management controller engine 304 in the management

| UNAVAILABLE MGMT CONTROLLER IDENTIFIER | UNAVAILABLE MGMT CONTROLLER PCIE BUS | PROXY MGMT CONTROLLER IDENTIFIER | PROXY MGMT CONTROLLER PCIE BUS | HEARTBEAT RECOVERY TIME (minutes) | STATUS |
|---|---|---|---|---|---|
| AA:AA:AA:AA:AA:AA | 1 | BB:BB:BB:BB:BB:BB | 2 | 5 | ACTIVE |

As will be appreciated by one of skill in the art in possession of the present disclosure, the mapping entry above identifies the management controller device 202a/300 that is included in the server device 202 (e.g., by its Media Access Control (MAC) address "AA:AA:AA:AA:AA:AA"), the PCIe bus ("1") connected to that management controller device 202a/300 that is included in the server device 202, the management controller device 204a/300 that is included in the server device 204 (e.g., by its Media Access Control (MAC) address "BB:BB:BB:BB:BB:B"), the PCIe bus ("2") connected to that management controller device 204a/300 that is included in the server device 204, a controller device 204a/300 may operate to provide one or more management controller service(s) 702 in a proxy management controller subsystem 700. As discussed above, in some embodiments the management controller service(s) 702 available in the management controller device 204a/300 may be configured to provide service(s) that became unavailable in the management controller device 202a included in the server device 202. However, in other embodiments the management controller service(s) 702 may be configured to provide service(s) that are currently available in the management controller device 202a included in the server device 202 (e.g., for the redundancy purposes discussed above). As such, in some examples, the management controller service(s) 702 may have been available in the management controller device 204a/300 prior to block 502, while in other examples the management controller service(s) 702 may have been provided in the management controller device 204a/300 at block 502.

Figure 7:
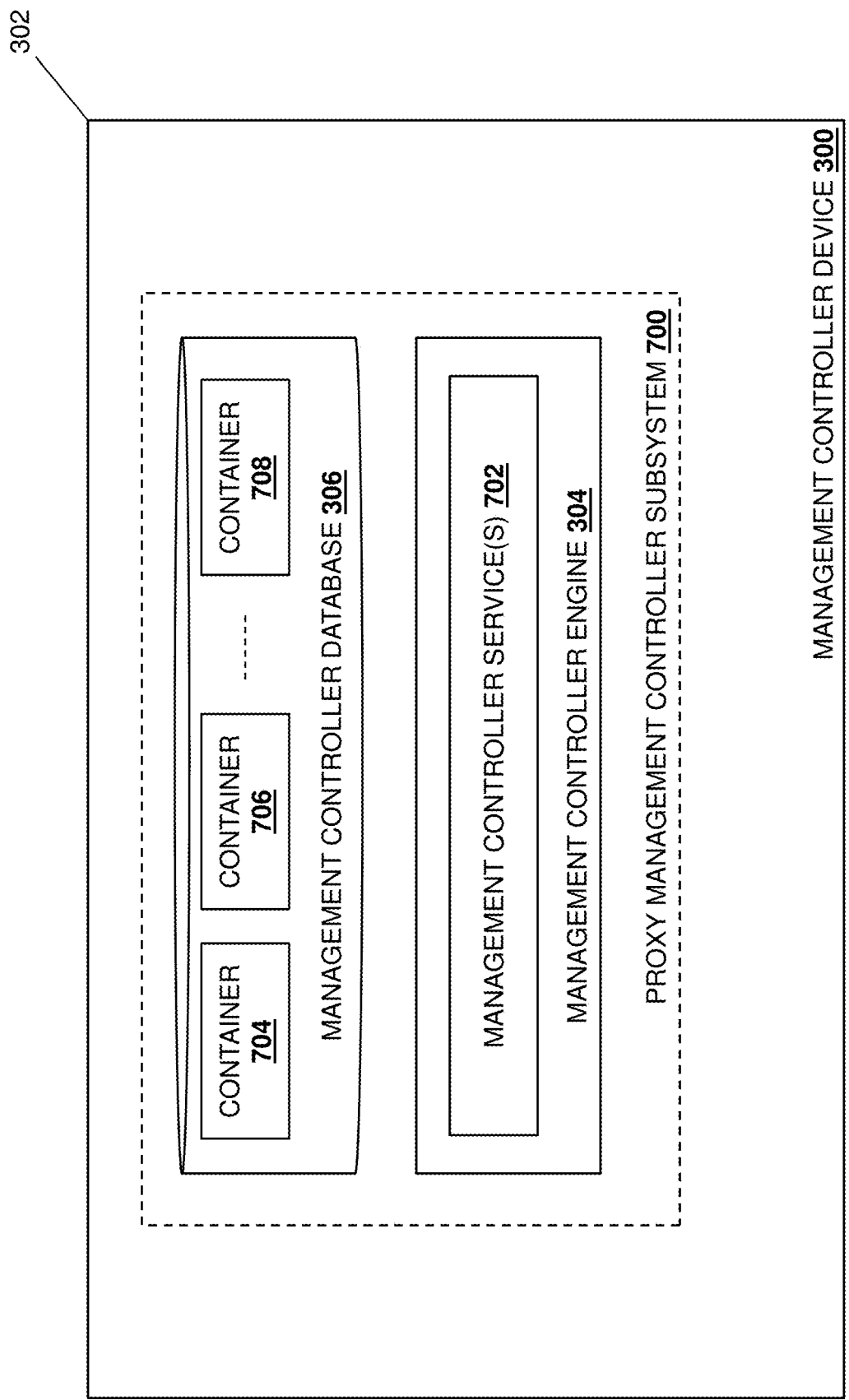
FIG. 7 is a schematic view illustrating an embodiment of the management controller device of FIG. 3 operating during the method of FIG. 5.

In an embodiment, at block 504 and in response to receiving the proxy management controller instruction at block 502, the management controller engine 304 in the management controller device 204a/300 included in the server device 204 may operate to create a container (e.g., a virtual container) in the management controller database 306 that is included in the proxy management controller subsystem 700, with that container 704 associated with the management controller device 202a included in the server device 202. For example, FIG. 7 illustrates a container 704 that may have been created by the management controller engine 304 in the management controller device 204a/300 included in the server device 204 as part of the management controller database 306, and associated with the management controller device 202a included in the server device 202 at block 504, and as discussed below may be utilized to store data (e.g., inventory information, sensor information, etc.) generated during the operation of the server device 202. Furthermore, FIG. 7 also illustrates containers 706 and up to 708 that may be created and associated with other management controller devices in the networked system 200 that have experienced a service unavailability and for which the management controller device 204a/300 included in the server device 204 is providing corresponding proxy management controllers. As such, while the containers 706 and up to 708 are not discussed in further detail below, one of skill in the art in possession of the present disclosure will appreciate that the containers 706 and up to 708 may be utilized to provide proxy management controllers for other management controller devices with unavailable services while remaining within the scope of the present disclosure as well.

In addition to creating and associating the container 704 with the management controller device 202a included in the server device 202, at block 504 the management controller engine 304 in the management controller device 204a/300 included in the server device 204 may also operate to spawn proxy daemons and/or other applications (e.g., as part of the management controller service(s) 702 that are separate from the container 704) that are configured to monitor raw data that is subsequently stored in the container 704, format that raw data to provide formatted data, analyze that formatted data, and/or perform other data operations that would be apparent to one of skill in the art in possession of the present disclosure.

Figure 8A:
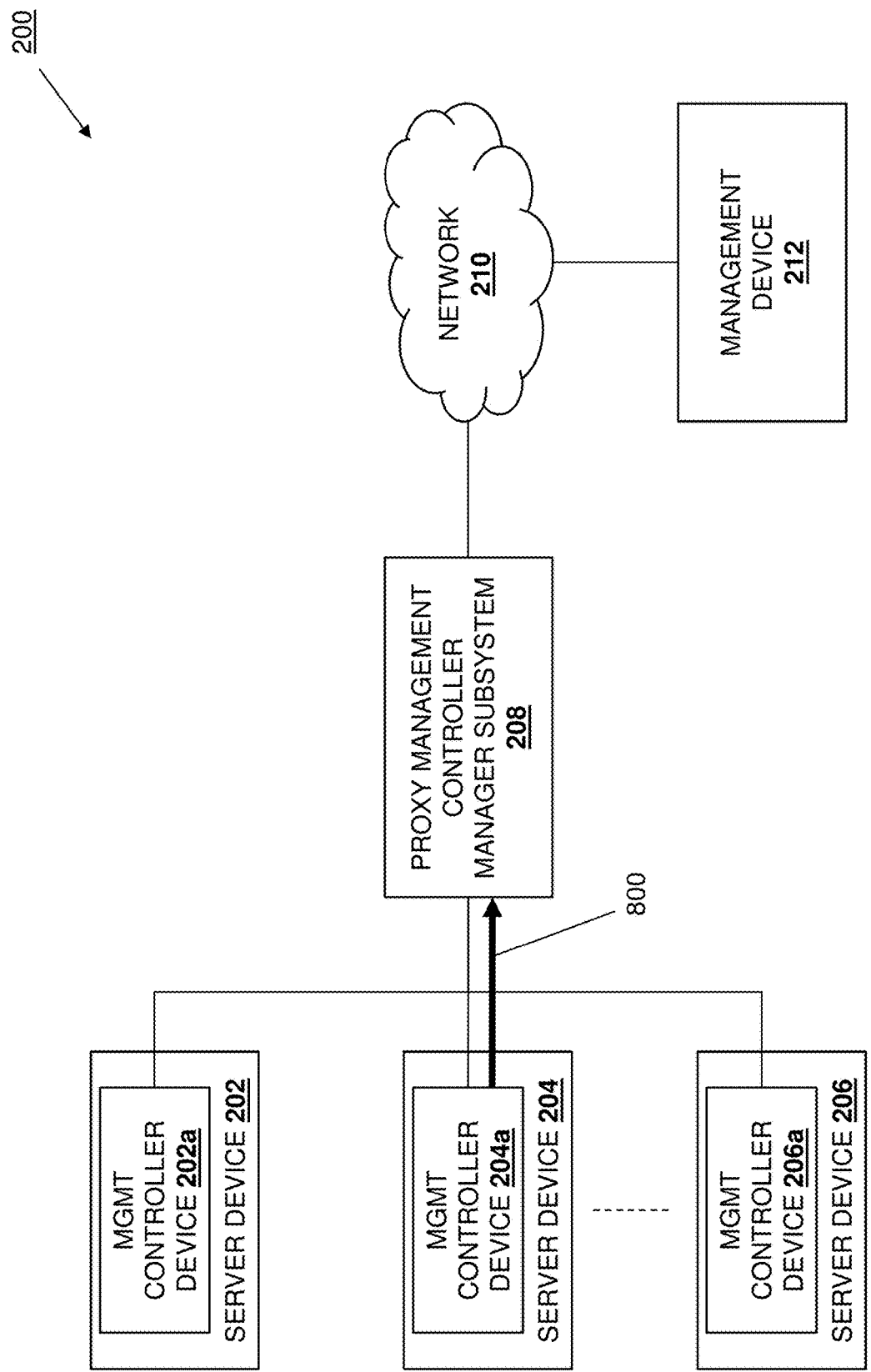
FIG. 8A is a schematic view illustrating an embodiment of the networked system of FIG. 2 operating during the method of FIG. 5.
Figure 8B:
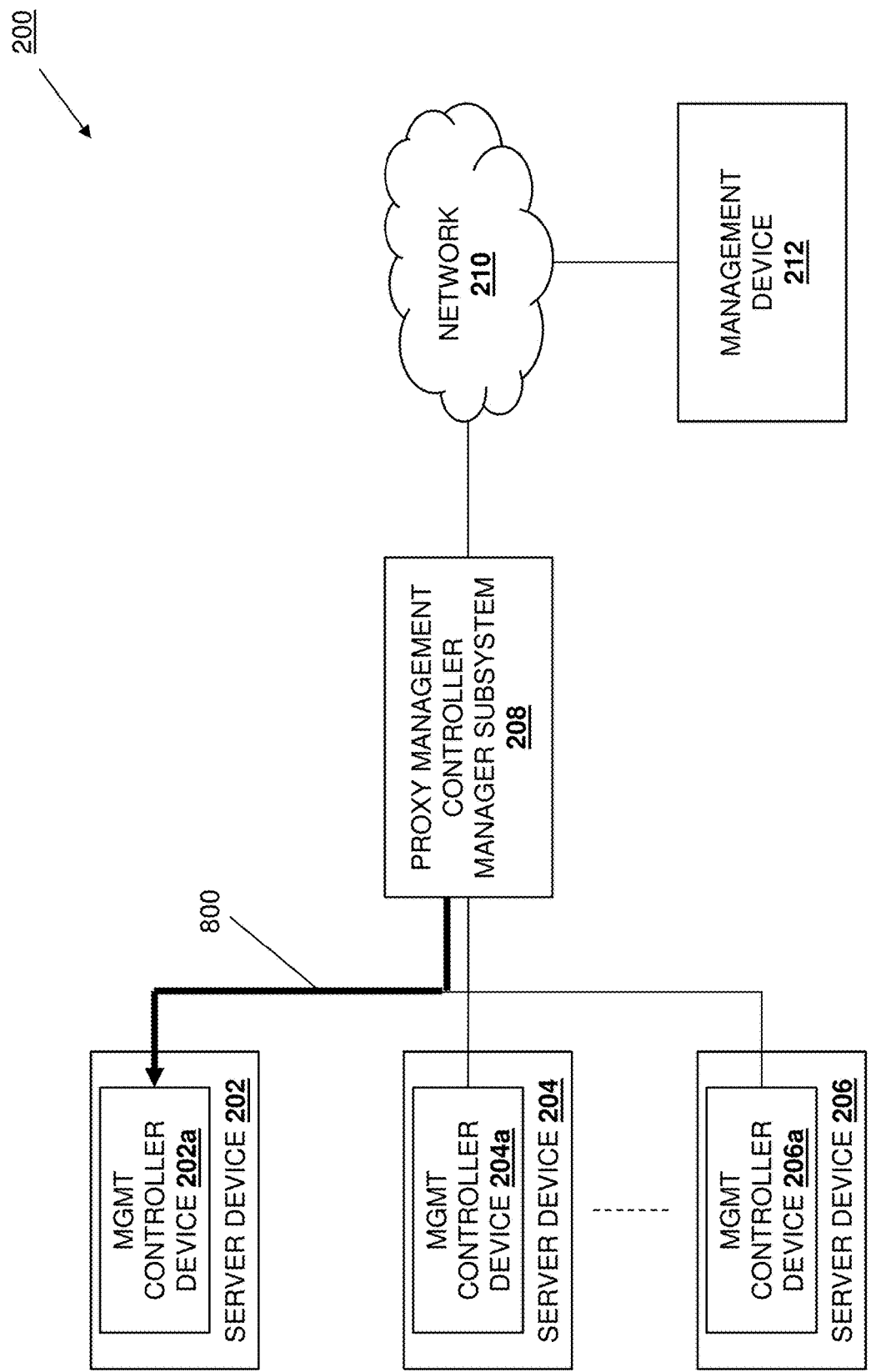
FIG. 8B is a schematic view illustrating an embodiment of the networked system of FIG. 2 operating during the method of FIG. 5.

The method 500 then proceeds to block 506 where the first management controller device receives and stores raw data collected by the second management controller device from a second server device. In an embodiment, at or prior to block 506, the management controller engine 304 in the management controller device 204a/300 included in the server device 204 may operate to cause the management controller device 202a/300 included in the server device 202 to transmit raw data generated by the server device 202 to the management controller device 204a/300. For example, with reference to FIGS. 8A and 8B, the management controller engine 304 in the management controller device 204a/300 may perform raw data transmission instruction operations 800 to transmit a raw data transmission instruction to the proxy management controller manager engine 404 in the proxy management controller manager subsystem 208/400, with the proxy management controller manager engine 404 in the proxy management controller manager subsystem 208/400 performing the raw data transmission instruction operations 800 to forward the raw data transmission instruction to the management controller engine 304 in the management controller device 202a/300, thus causing the management controller engine 304 in the management controller device 202a/300 (e.g., provided by a management controller co-processor or security processor in the management controller device 202a/300 that manages I²C communications with I²C sensors in the server device 202) to transmit raw data generated by the server device 202 to the management controller device 204a/300.

Figure 8C:
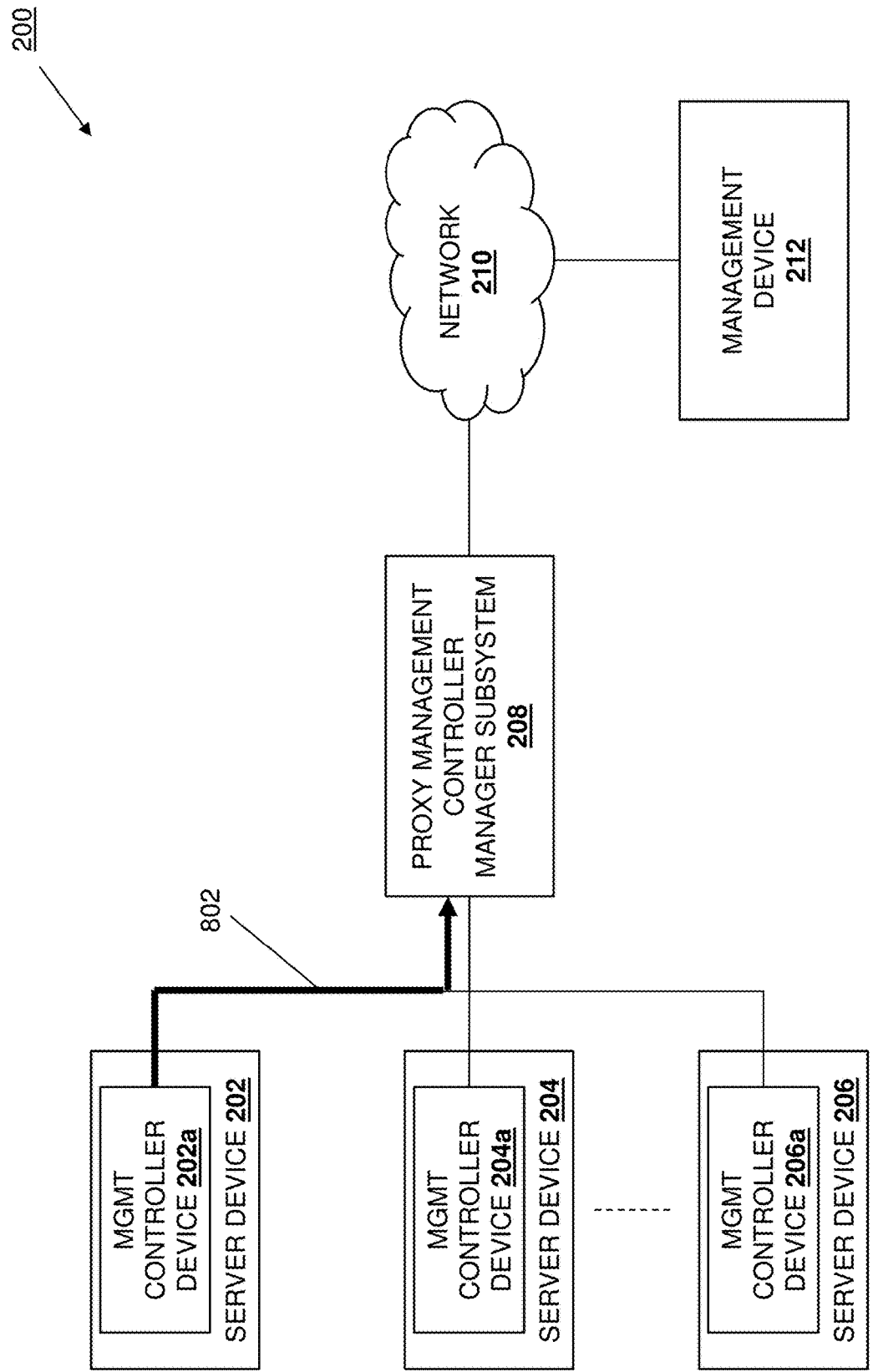
FIG. 8C is a schematic view illustrating an embodiment of the networked system of FIG. 2 operating during the method of FIG. 5.
Figure 8D:
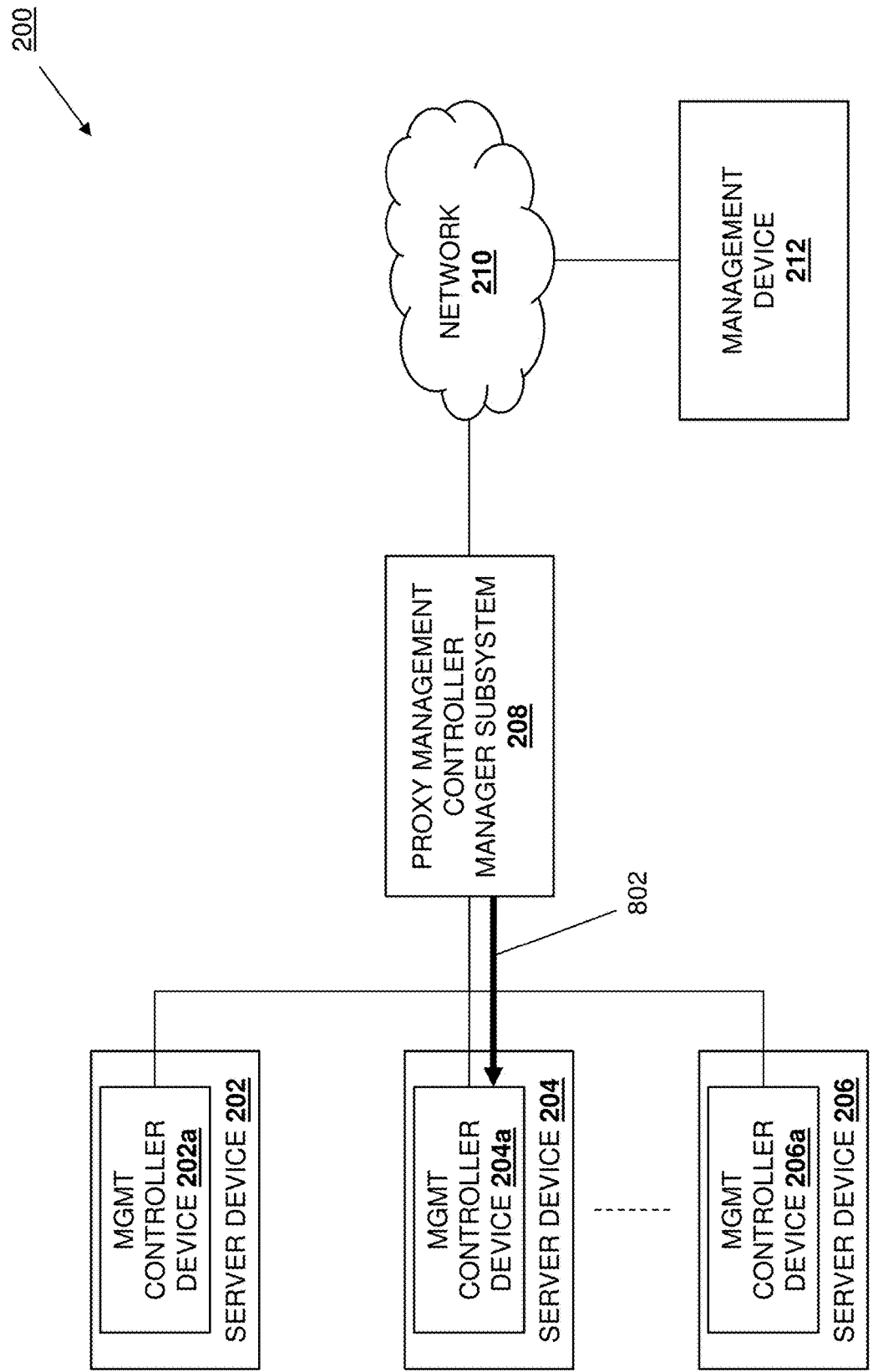
FIG. 8D is a schematic view illustrating an embodiment of the networked system of FIG. 2 operating during the method of FIG. 5.
Figure 8E:
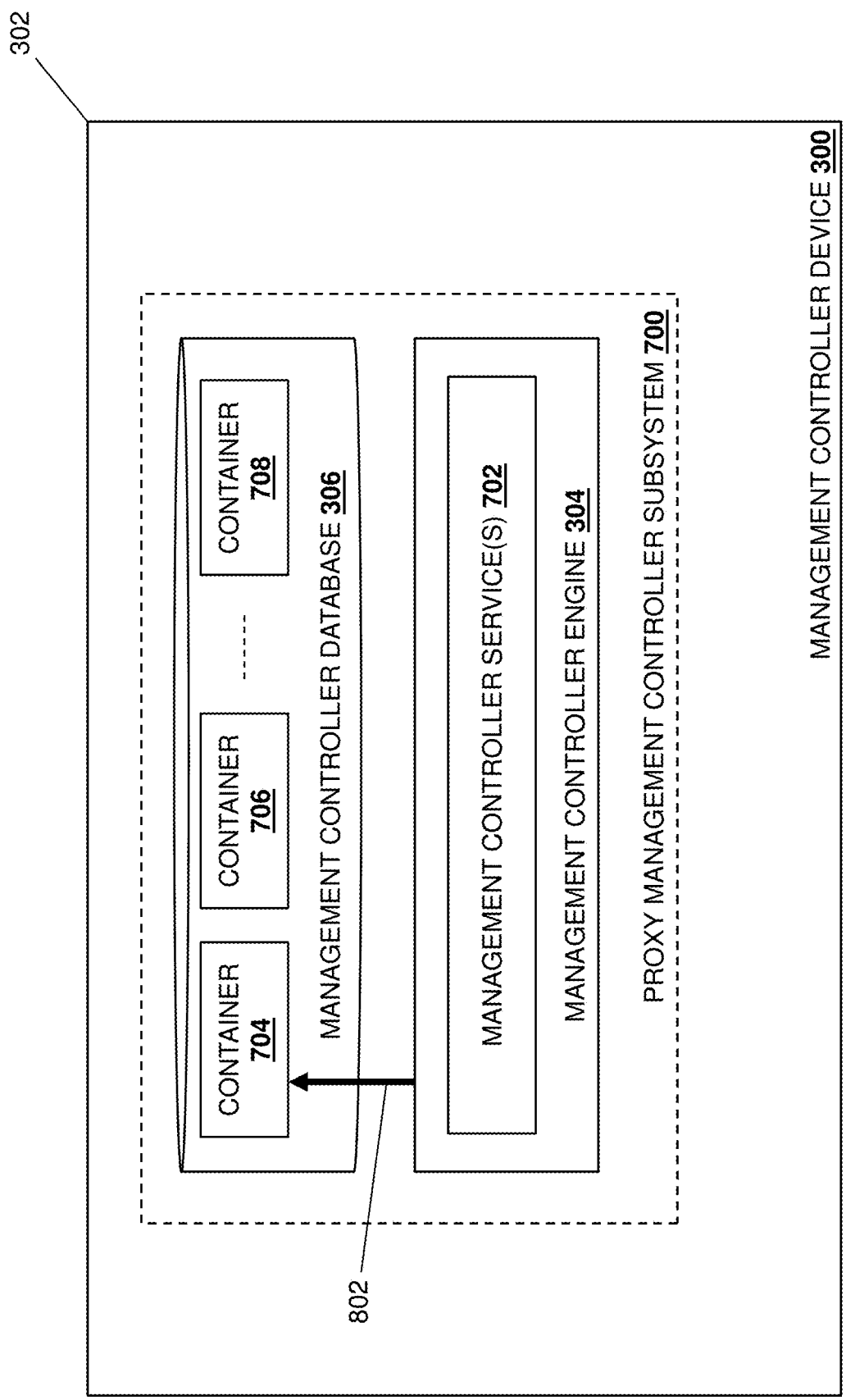
FIG. 8E is a schematic view illustrating an embodiment of the management controller device of FIG. 3 operating during the method of FIG. 5.

As illustrated in FIGS. 8C and 8D, the raw data transmission instruction may then cause the management controller engine 304 in the management controller device 202a/300 to perform raw data transmission operations 802 that include transmitting raw data generated by the server device 202 to the proxy management controller manager engine 404 in the proxy management controller manager subsystem 208, with the proxy management controller manager engine 404 in the proxy management controller manager subsystem 208 performing the raw data transmission operations 802 to forward the raw data to the management controller device 204a/300. As illustrated in FIG. 8E, at block 506 and as part of the raw data transmission operations 802, the management controller engine 304 in the management controller device 204a/300 may receive the raw data transmitted by the management controller engine 304 in the management controller device 202a/300 (e.g., via its communication system 308), and store that raw data in the container 704 in the management controller database 306 that was associated with the management controller device 202a/300 as discussed above.

The inventors of the present disclosure have developed a "unified raw data configuration" protocol that may be utilized by management controller devices with service unavailability to transmit raw data to a management controller device that provides it a proxy management controller. For example, the unified raw data configuration protocol may be a generic, internal protocol that may be utilized by a management controller device to transmit raw data generated by its server device using an internal passthrough communication channel (e.g., the NC-SI passthrough communication channel discussed above that utilizes a MCTP with PCIe VDMs) and to the management controller device providing its proxy management controller. As such, in a specific example, the management controller engine 304 in the management controller device 202a/300 may receive raw data generated by various sensors in the server device 202 (e.g., the I²C sensors discussed above) via corresponding communications channels (e.g., I²C communication channels), and then provide that raw data in a unified raw data configuration protocol content request, an example of which is provided below:

| FAN1 PWM | FAN2 PWM | ... | DEVICE1 TEMP | DEVICE2 TEMP | ... | ... |
|---|---|---|---|---|---|---|

As will be appreciated by one of skill in the art in possession of the present disclosure, the example of the unified raw data configuration protocol content request above provides raw data for operation (e.g., pulse width modulation in the illustrated example) of a first fan (e.g., "FAN1 PWM"), raw data for operation of a second fan (e.g., "FAN2 PWM"), raw data for temperature of a first device (e.g., "DEVICE1 TEMP"), and raw data for temperature of a second device (e.g., "DEVICE2 TEMP"). However, while a few specific examples are provided, one of skill in the art in possession of the present disclosure will recognize that raw data may be provided for a wide variety of components and/or component operations in a server device while remaining within the scope of the present disclosure as well. As such, the proxy management controller manager engine 404 in the proxy management controller manager subsystem 208 may receive the unified raw data configuration protocol content request from the management controller engine 304 in the management controller device 202*a*/300, and forward that unified raw data configuration protocol content request to the management controller engine 304 in the management controller device 204*a*/300, which allows the management controller engine 304 in the management controller device 204*a*/300 to store the raw data included therein in the container 704 as discussed above. In some embodiments, the unified raw data configuration protocol content request may be utilized by the management controller engine 304 in the management controller device 202*a*/300 to transmit any and all raw data generated by its server device 202.

However, while specific techniques for transmitting raw data (e.g., inventory information, real-time sensor details, etc.) generated by sensors in a server device between a first management controller device in that server device and a second management controller device in a different server device has been described, one of skill in the art in possession of the present disclosure will appreciate that the transmission of raw data between management controller devices as described above may be accomplished using a variety of techniques while remaining within the scope of the present disclosure as well.

Figure 9:
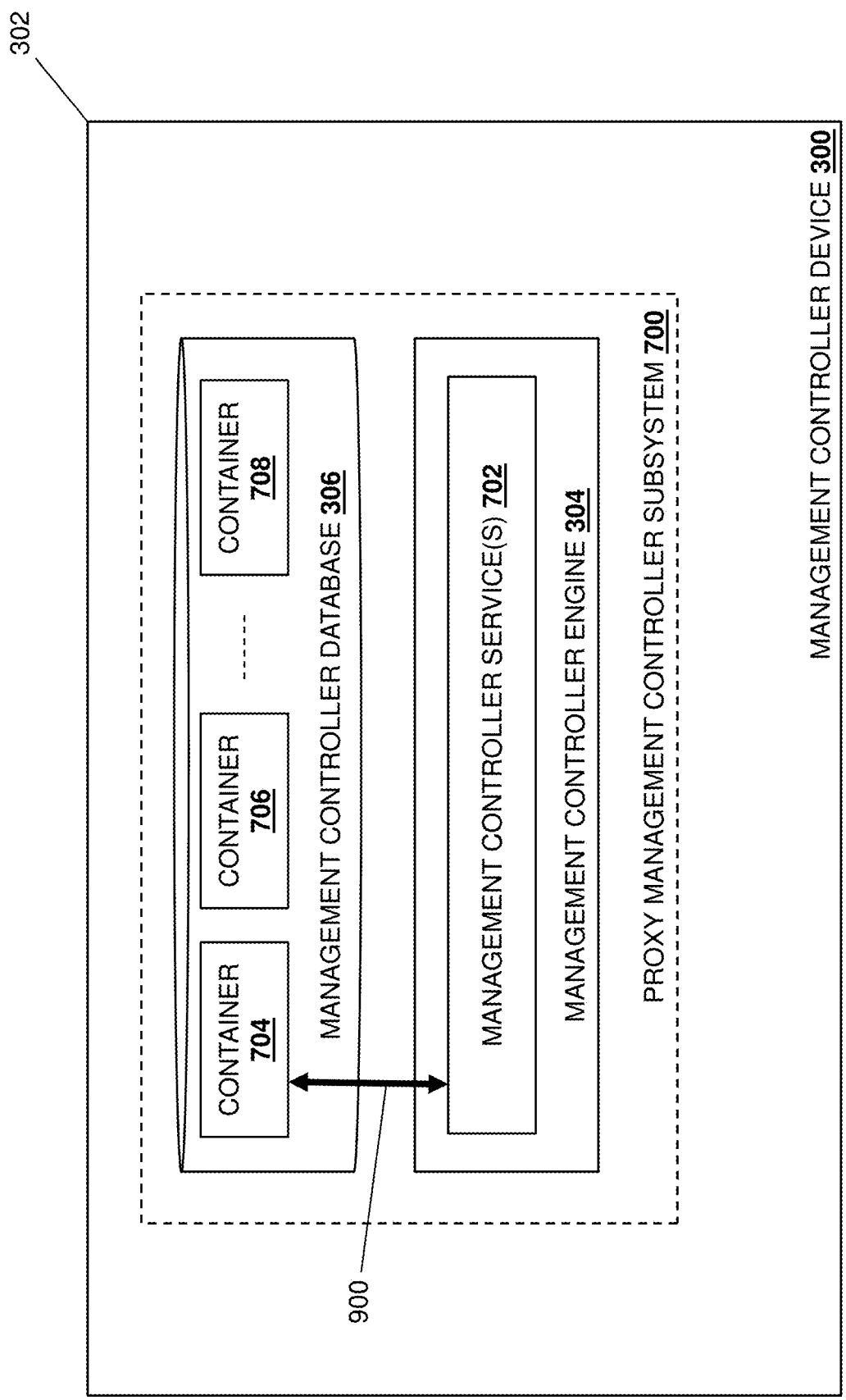
FIG. 9 is a schematic view illustrating an embodiment of the management controller device of FIG. 3 operating during the method of FIG. 5.

The method 500 then proceeds to block 508 where the first management controller device converts the raw data to formatted data. In an embodiment, at block 508 and following the storage of the raw data received from the management controller engine 304 in the management controller device 202*a*/300, the management controller engine 304 in the management controller device 204*a*/300 may operate to convert that raw data to formatted data. As illustrated in FIG. 9, at block 508, the management controller engine 304 in the management controller device 204*a*/300 may utilize the management controller service(s) 702 to perform data conversion operations 900 to access the raw data stored in the container 704 included in the management controller database 306, convert that raw data to formatted data (e.g., DM objects), and store that formatted data in the container 704 included in the management controller database 306. As such, in the event a service in the management controller device 202*a*/300 is unavailable for converting the raw data generated by the server device 202 to formatted data, the proxy manager controller subsystem 700 in the management controller device 204*a*/300 may provide a proxy management controller that converts the raw data generated by the server device 202 to formatted data.

The method 500 then proceeds to block 510 where the first management controller device uses the formatted data to perform one or more management operations associated with the second management controller device. In an embodiment, at block 510, the proxy manager controller subsystem 700 in the management controller device 204*a*/300 may use the formatted data stored in the container 704 in the management controller database 306 in order to perform a variety of management operations associated with the management controller device 202*a*/300. As will be appreciated by one of skill in the art in possession of the present disclosure, in the event the proxy management controller discussed above is provided for redundancy purposes, the management operation(s) performed at block 510 may be performed by the management controller device providing that proxy management controller in response to determining that the management controller device for which the proxy management controller is being provided is currently unavailable to perform those management operation(s).

Figure 10A:
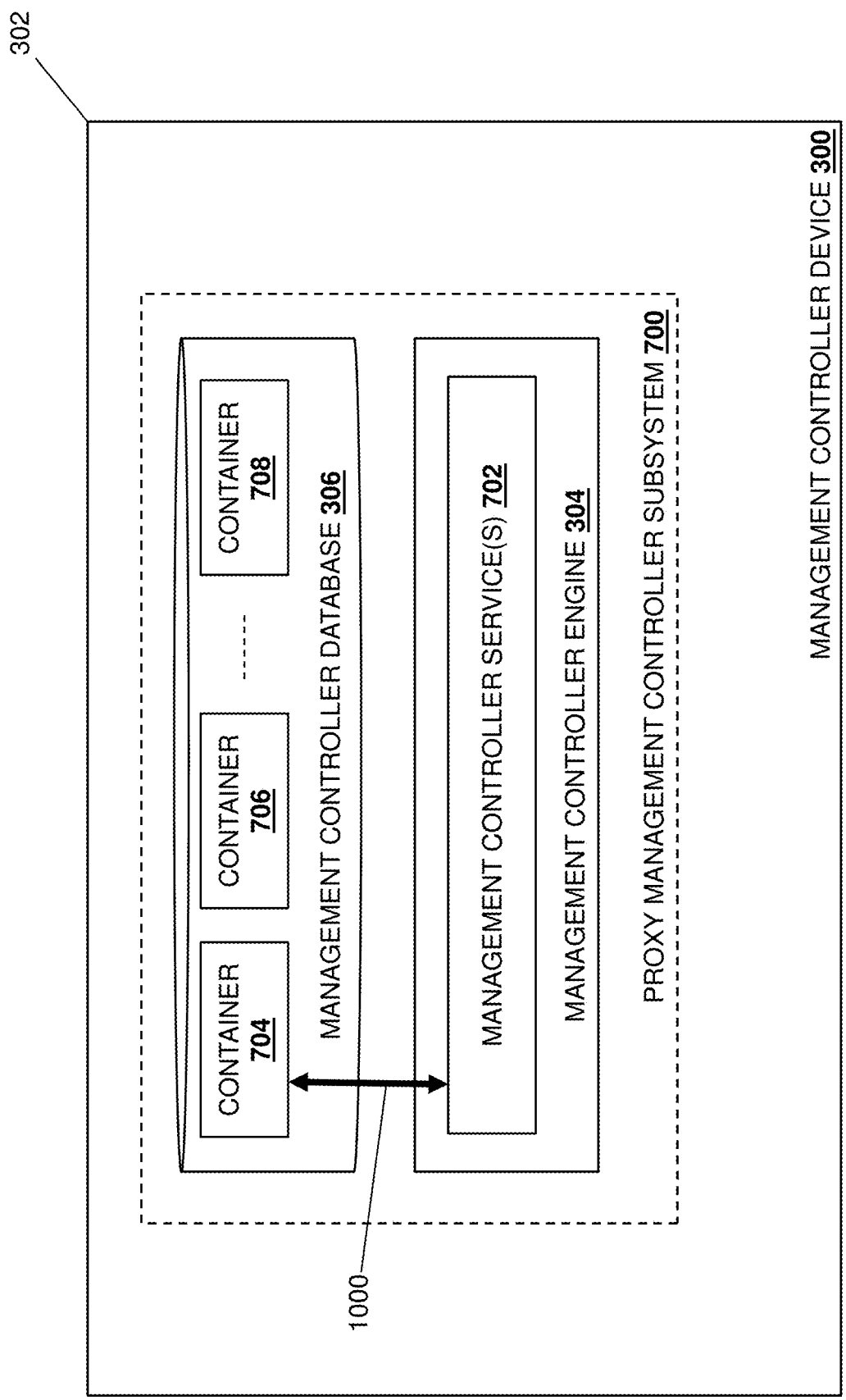
FIG. 10A is a schematic view illustrating an embodiment of the management controller device of FIG. 3 operating during the method of FIG. 5.
Figure 10B:
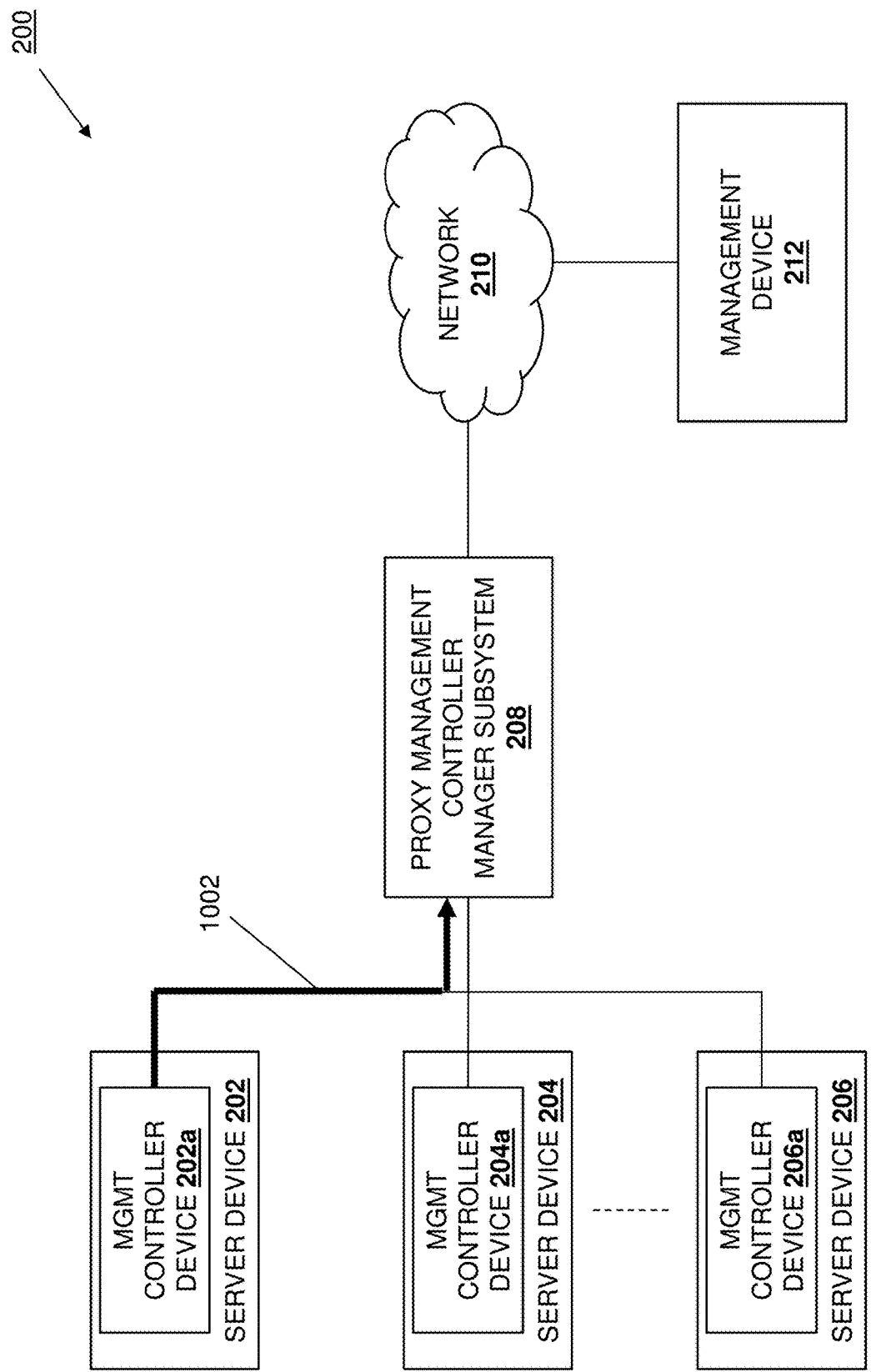
FIG. 10B is a schematic view illustrating an embodiment of the networked system of FIG. 2 operating during the method of FIG. 5.
Figure 10C:
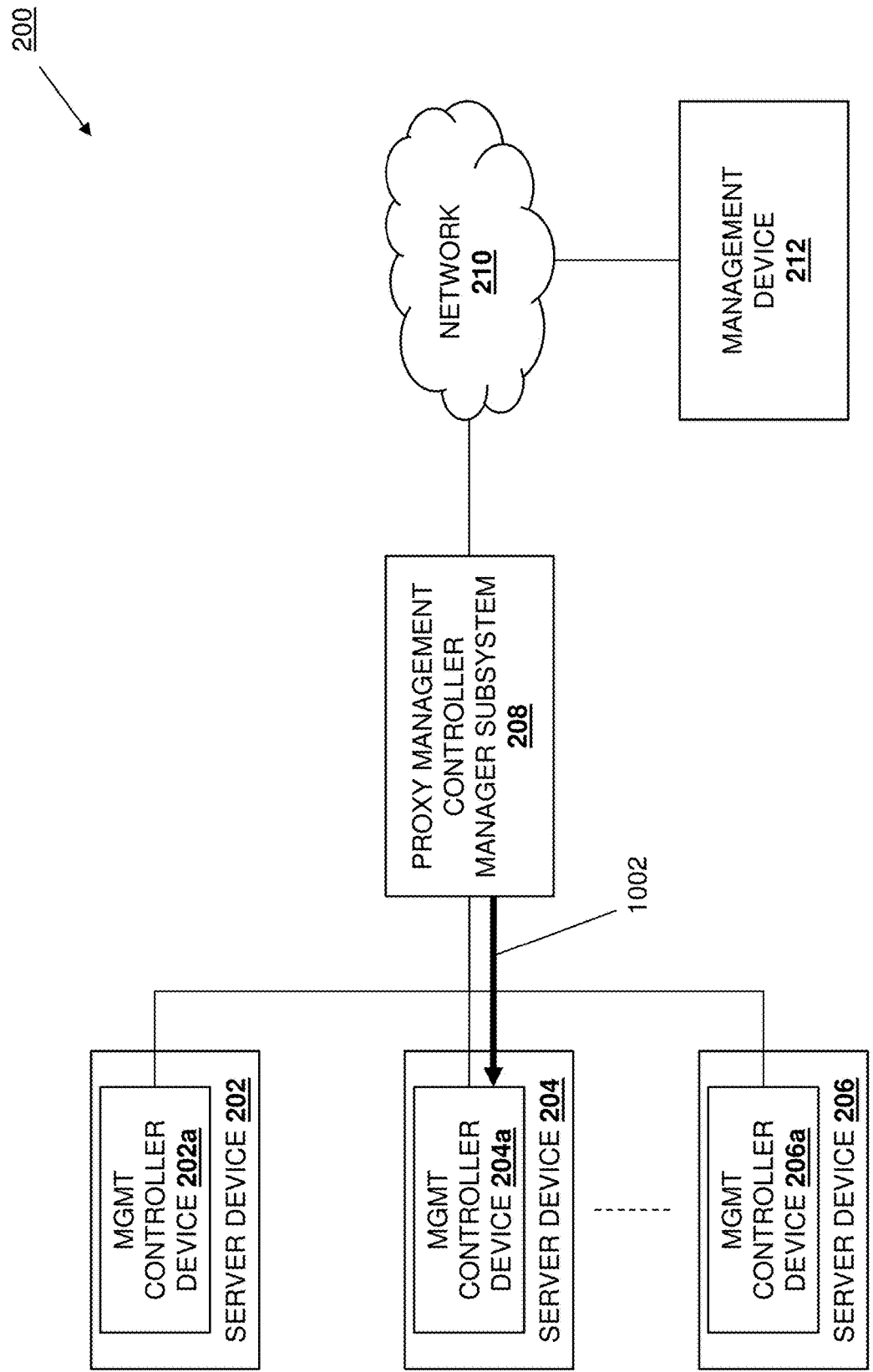
FIG. 10C is a schematic view illustrating an embodiment of the networked system of FIG. 2 operating during the method of FIG. 5.

For example, at block 510 and as illustrated in FIG. 10A, the management controller engine 304 in the management controller device 204*a*/300 may utilize the management controller service(s) 702 to perform component operation modification identification operations 1000 that include identifying, based on the formatted data in the container 704, a component operation modification for a server device component in the server device 202. As will be appreciated by one of skill in the art in possession of the present disclosure, the formatted data may indicate that a service device component in the server device 202 requires modification of its operation (e.g., a thermal control component such as a fan may require modification of its operation to produce more or less airflow, a power control component such as a power switch may require modification of its operation to provide or prevent power to the server device, etc.). As such, in response to identifying the component operation modification for a server device component in the server device 202 based on the formatted data and as illustrated in FIGS. 10B and 10C, the management controller engine 304 in the management controller device 204*a*/300 may perform component operation modification instruction transmission operations 1002 to transmit a component operation modification instruction to the management controller device 202*a*/300 via the proxy management controller manager subsystem 208, with the component operation modification instruction configured to cause the management controller device 202*a*/300 to modify operation of the server device component in the server device 202.

In a specific example and in response to identifying the component operation modification for a server device component in the server device 202 based on the formatted data, the management controller engine 304 in the management controller device 204*a*/300 may generate the component operation modification instruction in a unified raw data configuration protocol control request, an example of which is provided below:

| HOST POWER ON/OFF | NEW FAN1 PWM | NEW FAN2 PWM | ... | ... | ... |
|---|---|---|---|---|---|

As will be appreciated by one of skill in the art in possession of the present disclosure, the example of the unified raw data configuration protocol control request above provides the ability to send an instruction to control operations of a power control component (e.g., "HOST POWER ON/OFF"), and control operations of thermal control components (e.g., "NEW FAN1 PWM" and "NEW FAN2 PWM" that change the pulse width modulation of fan devices in the server device 202). However, while a few specific examples are provided, one of skill in the art in possession of the present disclosure will recognize that operations of a variety of components in a server device may be controlled while remaining within the scope of the present disclosure as well. As such, the proxy management controller manager engine 404 in the proxy management controller manager subsystem 208 may receive the unified raw data configuration protocol control request from the management controller engine 304 in the management controller device 204*a*/300, and forward that unified raw data configuration protocol control request (e.g., using an e-switch in the multi-host SmartNIC device) to the management controller engine 304 in the management controller device 202*a*/300, which allows the management controller engine 304 in the management controller device 202*a*/300 to modify the operation of its components as discussed above based on that unified raw data configuration protocol control request. As such, in the event a service (e.g., a thermal control algorithm, a power control algorithm, etc.) in the management controller device 202*a*/300 is unavailable for controlling components in the server device 202, the proxy manager controller subsystem 700 in the management controller device 204*a*/300 may provide a proxy management controller that monitors the operations of the components in the server device 202, and sends control instructions to the management controller device 202*a* in the server device 202 to control the operations of components in that server device 202 based on that monitoring.

Figure 11A:
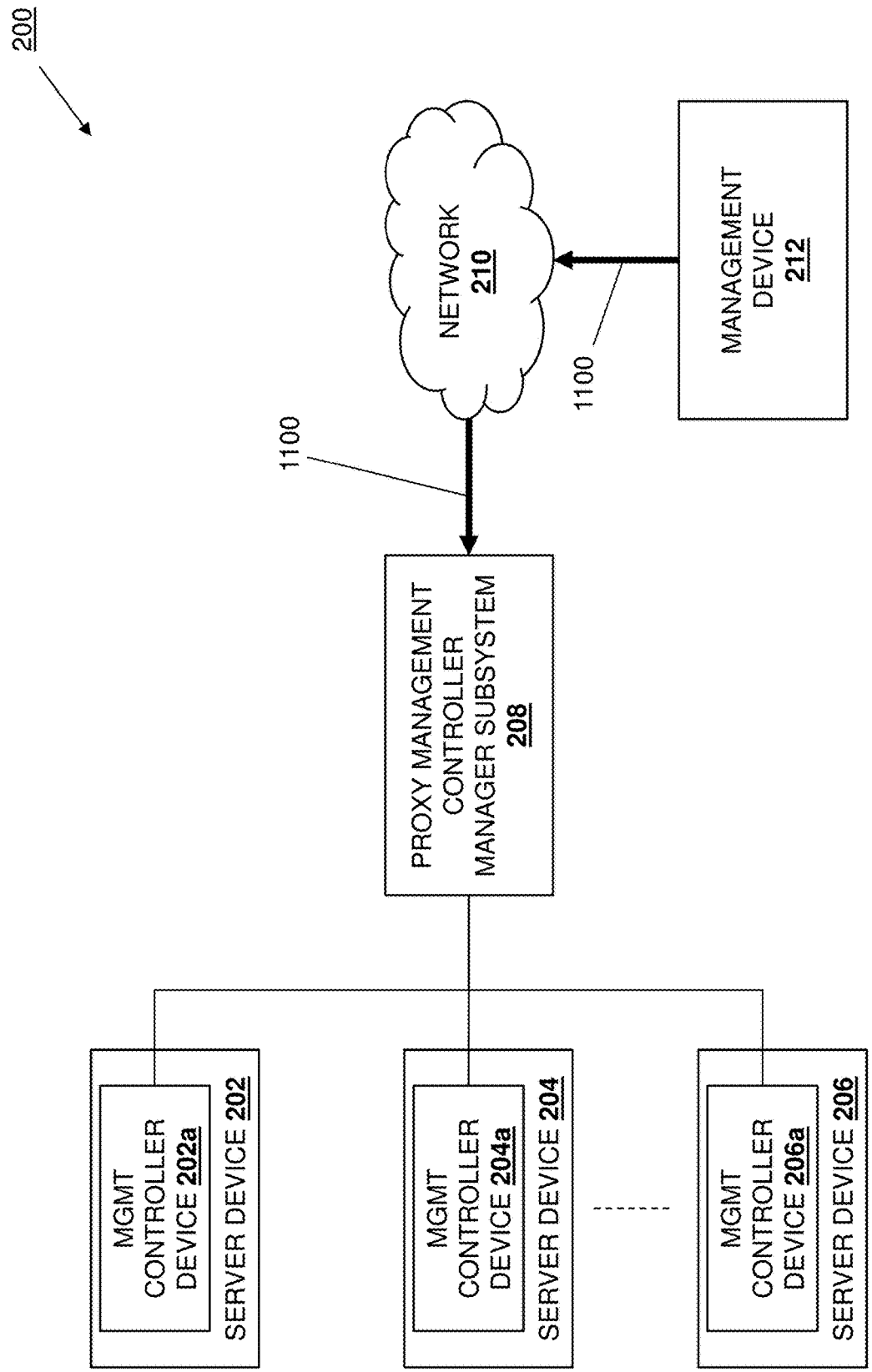
FIG. 11A is a schematic view illustrating an embodiment of the networked system of FIG. 2 operating during the method of FIG. 5.
Figure 11B:
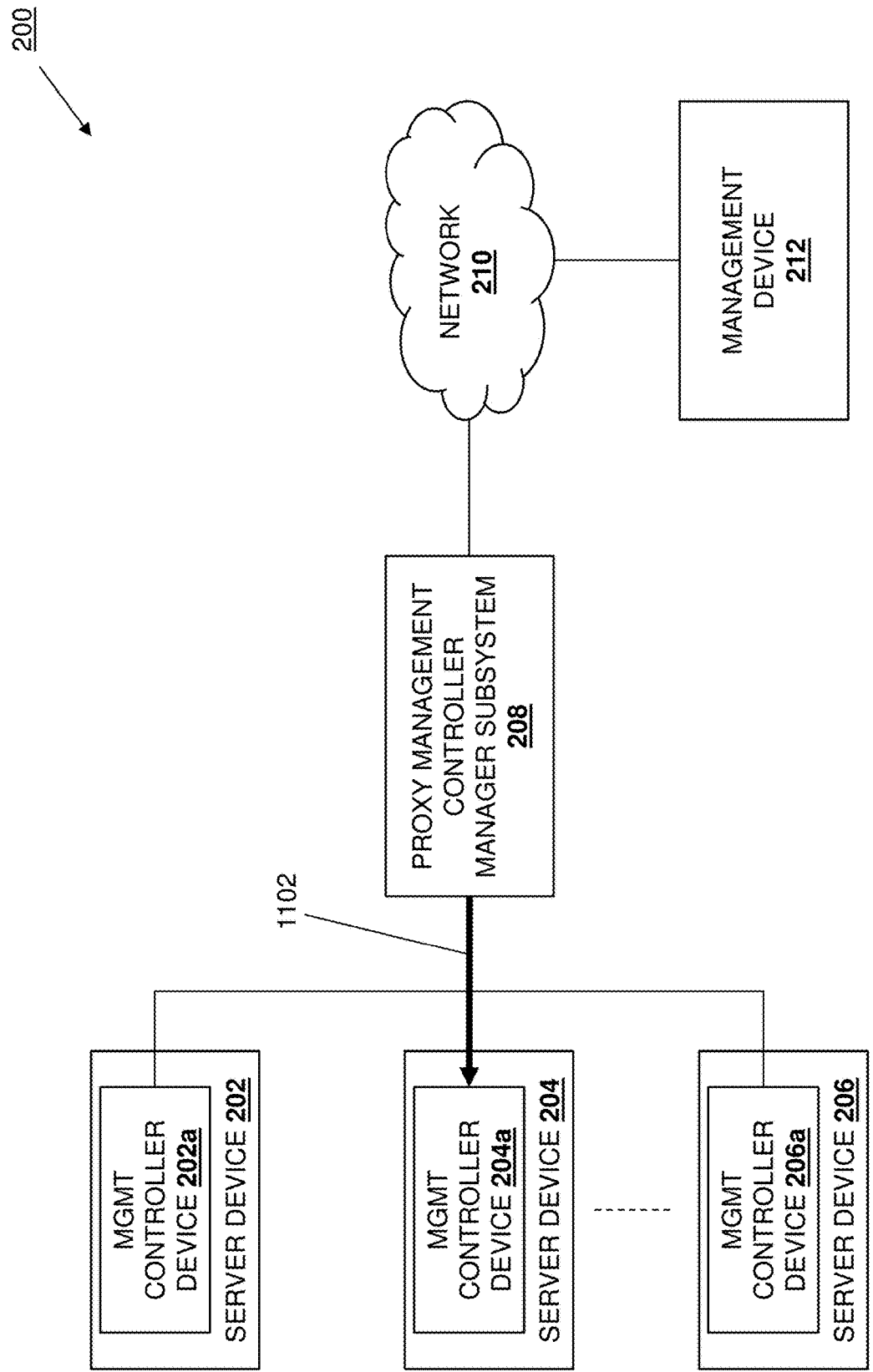
FIG. 11B is a schematic view illustrating an embodiment of the networked system of FIG. 2 operating during the method of FIG. 5.

In another example, at block 510, the management controller engine 304 in the management controller device 204*a*/300 may receive a server device management request for the server device 202 from the proxy management controller manager subsystem 208. For example, with reference to FIG. 11A, a network administrator or other user may utilize the management device 212 to perform server device management request transmission operations 1100 that include generating and transmitting a server device management request (which may be provided via a Remote Access Controller Administrator (racadm) command, a Graphic User Interface (GUI) command, a REDFISH® command, etc., and is directed to the management controller device 202*a* in the server device 202) via the network 210 and to the proxy management controller manager subsystem 208. With reference to FIG. 11B and in response to receiving the server device management request, the proxy management controller manager engine 404 in the proxy management controller manager subsystem 208/400 may perform server device management request forwarding operations 1102 that include forwarding that server device management request to the management controller device 202*a* in the server device 202, and may then begin to monitor for a server device management request timeout associated with that server device management request.

With reference to FIG. 11C, in the event the server device management request timeout expires (e.g., the management controller device 202*a* returns a server device management request timeout), the proxy management controller manager engine 404 in the proxy management controller manager subsystem 208/400 may then perform server device management request forwarding operations 1104 that include forwarding that server device management request to the management controller device 204*a* in the server device 204 that is providing the proxy management controller for the management controller device 202*a* in the server device 202. For example, in response to a server device management request timeout expiration, the proxy management controller manager engine 404 in the proxy management controller manager subsystem 208/400 may replace a MAC address for the management controller device 202*a* that is included in the server device management request with a MAC address for the management controller device 204*a*, and may forward that server device management request (e.g., with a proxy management controller bit set in that server device management request).

Figure 11D:
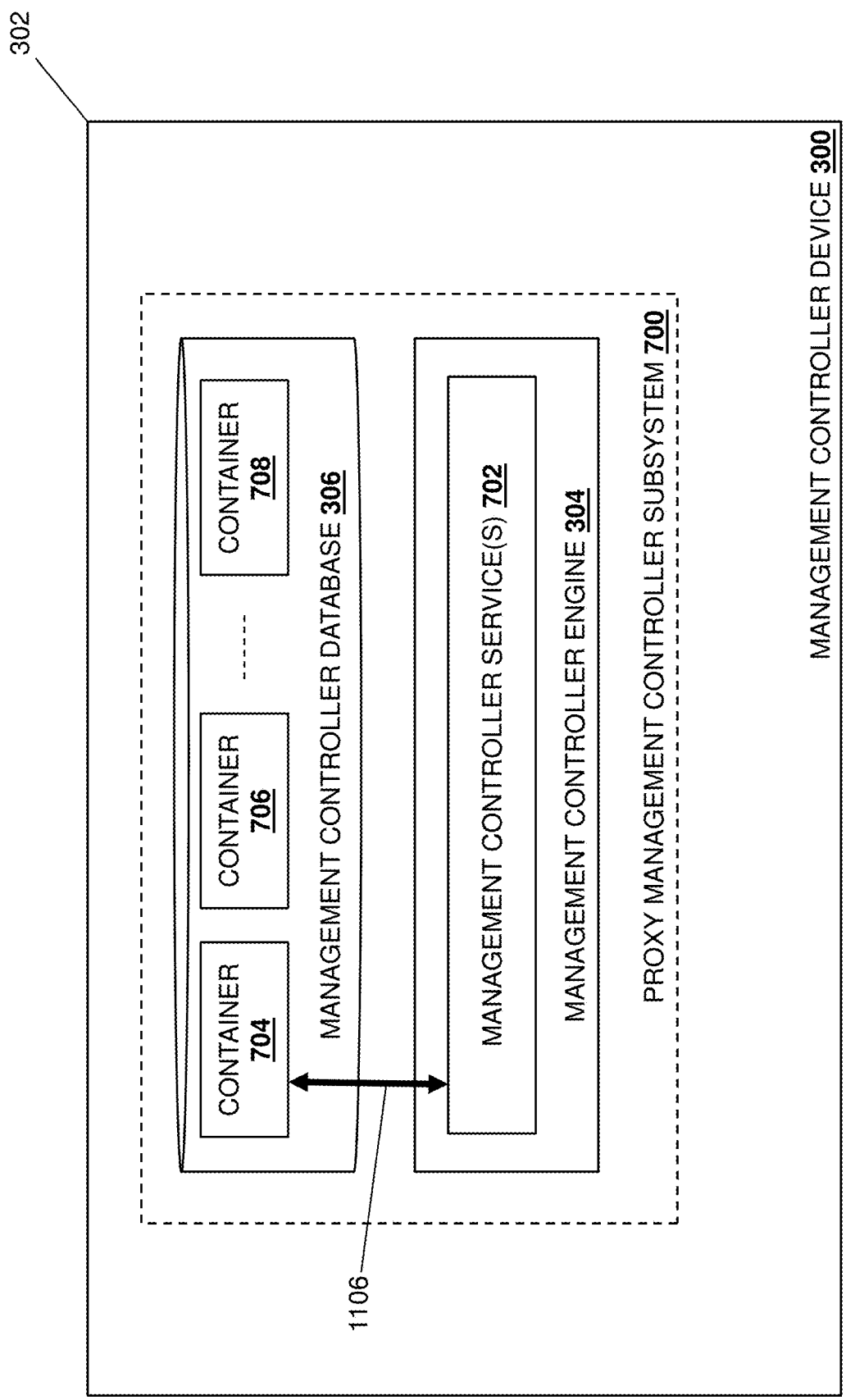
FIG. 11D is a schematic view illustrating an embodiment of the management controller device of FIG. 3 operating during the method of FIG. 5.

As illustrated in FIG. 11D and in response to receiving the server device management request discussed above from the proxy management controller manager subsystem 208, the management controller engine 304 in the management controller device 204*a*/300 in the server device 204 may utilize the management controller service(s) 702 to perform server device management response identification operations 1106 to identify, using the formatted data (e.g., DM object(s)) in the container 704 and based on the server device management request, a server device management response to the server device management request. With reference to FIG. 11E, the management controller engine 304 in the management controller device 204*a* in the server device 204 may then perform server device management response transmission operations 1108 that include transmitting the server device management response to the proxy management controller manager subsystem 208.

Figure 11F:
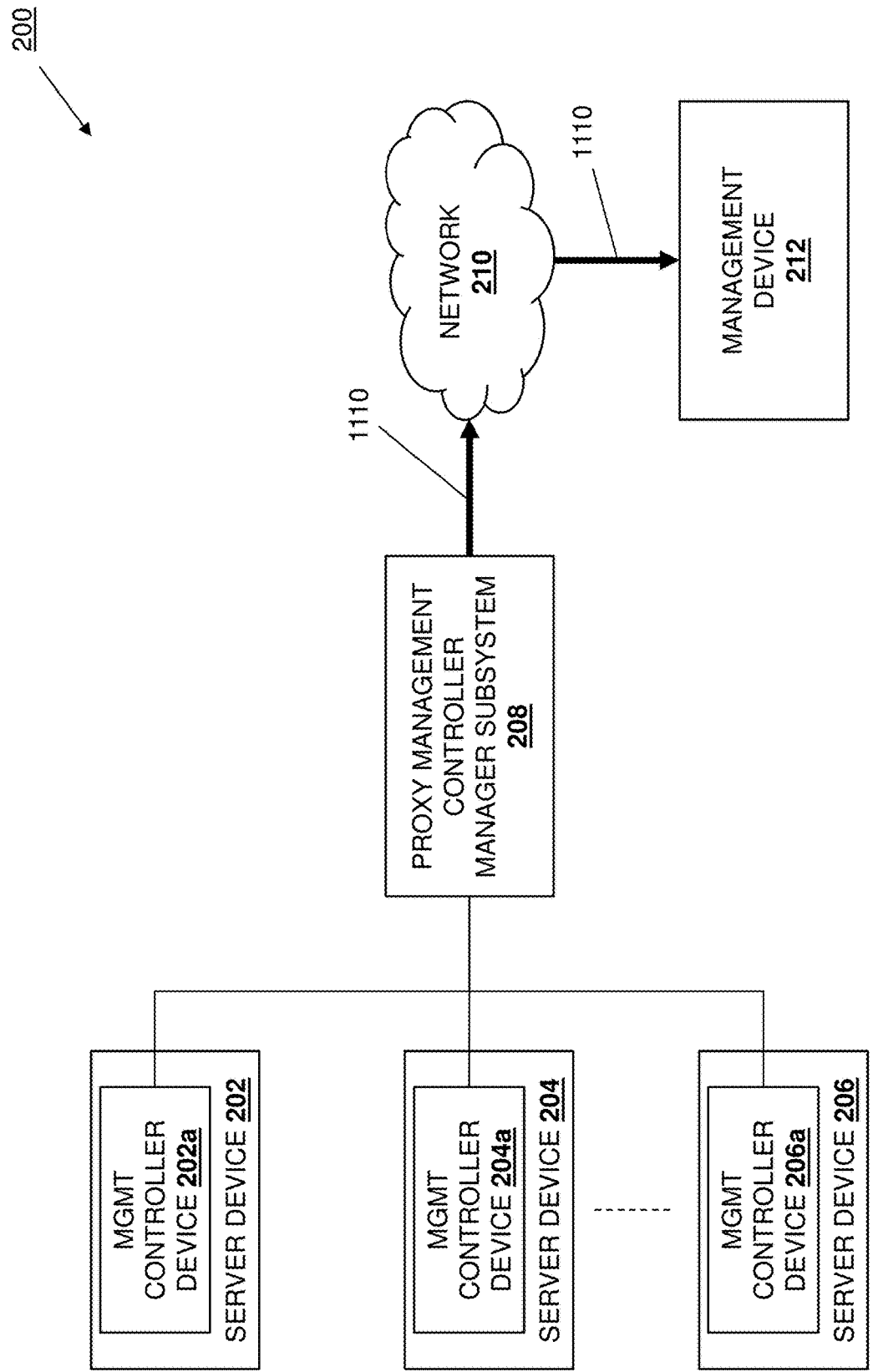
FIG. 11F is a schematic view illustrating an embodiment of the networked system of FIG. 2 operating during the method of FIG. 5.

As illustrated in FIG. 11F and in response to receiving the server device management response from the management controller engine 304 in the management controller device 204*a*, the proxy management controller manager engine 404 in the proxy management controller manager subsystem 208/400 may perform server device management response forwarding operations 1110 that include replacing a MAC address for the management controller device 204*a* that is included in the server device management response with a MAC address for the management controller device 202*a* (thus emulating the management controller device 202*a* as an "active" management controller device), and forwarding that server device management response via the network 210 to the management device 212. As such, in the event a service in the management controller device 202*a*/300 is unavailable for responding to management requests for the server device 202, the proxy manager controller subsystem 700 in the management controller device 204*a*/300 may provide a proxy management controller that responds to management requests for in the server device 202.

Thus, systems and methods have been described that provide for the use of a neighboring management controller device in a neighboring server device to operate as a virtual/proxy management controller for another management controller device in another server device that has one or more of its services become unavailable, and perform those service(s) on behalf of that management controller device. For example, the proxy management controller system of the present disclosure may include a first management controller device in a first server device, a second management controller device in a second server device, and a multi-host SmartNIC device coupled to the first and second management controller device. The first management controller device receives an instruction from the multi-host SmartNIC device to provide a proxy management controller for the second management controller device, and creates a proxy management controller virtual container for the second management controller device. The first management controller device then receives raw data collected by the second management controller device from the second server device, stores the raw data in the proxy management controller virtual container, and converts the raw data to formatted data. The first management controller device then uses the formatted data to perform at least one management operation that is associated with the second management controller device. As such, management controller devices with unavailable service(s) but partial functionality (e.g., with the ability to collect raw data from their server devices) may have management activities performed by neighboring management controller devices in order to ensure operation of their associated server devices.

However, as discussed above, while many of the embodiments detailed herein utilize a multi-host SmartNIC device as the proxy management controller manager subsystem of the present disclosure, other embodiments are envisioned as falling within the scope of the present disclosure as well. For example, in situations in which a multi-host SmartNIC device is not available, the proxy management controller system of the present disclosure may be provided using a management controller group manager (e.g., an iDRAC® group manager) that is provided with (or by one of) a plurality of management controller devices. As will be appreciated by one of skill in the art in possession of the present disclosure, a plurality of management controller devices may nominate one of those management controller devices to operate as the management controller group manager, or a management controller group manager may be provided as a separate device from the plurality of management controller devices that it manages. As such, one of skill in the art in possession of the present disclosure will appreciate how the management controller group manager may operate in a substantially similar manner as the multi-host SmartNIC device discussed above (but without the additional intelligence and processing speed typically available in multi-host SmartNIC devices) to provide the proxy management controller manager subsystem functionality described herein.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A proxy management controller system, comprising:
a second management controller device that is included in a second server device;
a proxy management controller manager subsystem that is coupled to the second management controller device; and
a first management controller device that is included in a first server device and that is coupled to the second management controller device and the proxy management controller device, wherein the first management controller device includes at least one-first hardware processor that is configured to:
receive, from the proxy management controller manager subsystem, an instruction to provide a proxy management controller for the second management controller device;
create, in response to receiving the instruction to provide the proxy management controller for the second management controller device, a proxy management controller virtual container that is associated with the second management controller device;
receive, from the second management controller device, raw data that was generated by the second server device based on its operation and collected by the second management controller device from the second server device;
store the raw data in the proxy management controller virtual container;
convert the raw data that is stored in the proxy management controller virtual container to formatted data; and
provide the proxy management controller for the second management controller device by using the formatted data to perform at least one management operation for the second management controller device that is unavailable and that would otherwise perform the at least one management operation absent its unavailability.

2. The system of claim 1, wherein the at least one management operation includes:
identifying, based on the formatted data, a second server device component operation modification for a second server device component in the second server device; and
transmitting a second server device component operation modification instruction to the second management controller device, wherein the second server device component operation modification instruction is configured to cause the second management controller device to modify operation of the second server device component in the second server device.

3. The system of claim 2, wherein the second server device component operation modification instruction is configured to cause at least one second hardware processor system in the second management controller device to modify operation of at least one of:
a thermal control component that provides the second server device component; or
a power control component that provides the second server device component.

4. The system of claim 1, wherein the at least one management operation includes:
receiving, from the proxy management controller manager subsystem, a second server device management request;
identifying, using the formatted data and based on the second server device management request, a second server device management response; and
transmitting, to the proxy management controller manager subsystem, the second server device management response.

5. The system of claim 1, wherein the second management controller device includes at least one service that is unavailable to perform the at least one proxy management operation.

6. The system of claim 1, wherein the second management controller device includes at least one service that is unavailable to convert the raw data to the formatted data.

7. The system of claim 1, wherein the proxy management controller manager subsystem includes at least one second hardware processor that is configured to:
transmit, to the first management controller device, the instruction to provide the proxy management controller for the second management controller device in response to determining that at least one service that enables the at least one management operation and that is provided by the second management controller device has become unavailable.

8. An Information Handling System (IHS), comprising:
a processing system; and
a memory system that is coupled to the processing system and that includes instructions that, when executed by the processing system, cause the processing system to provide a management controller engine that is configured to:

receive, from a proxy management controller manager subsystem, an instruction to provide a proxy management controller for a management controller device in a server device;

create, in response to receiving the instruction to provide the proxy management controller for the management controller device in the server device, a proxy management controller virtual container that is associated with the management controller device;

receive, from the management controller device, raw data that was generated by the server device based on its operation and collected by the management controller device from the server device;

store the raw data in the proxy management controller virtual container;

convert the raw data that is stored in the proxy management controller virtual container to formatted data; and provide the proxy management controller for the management controller device by using the formatted data to perform at least one proxy management operation for the management controller device that is unavailable and that would otherwise perform the at least one management operation absent its unavailability.

9. The IHS of claim 8, wherein the at least one management operation includes:

identifying, based on the formatted data, a server device component operation modification for a server device component in the server device; and transmitting a server device component operation modification instruction to the management controller device, wherein the server device component operation modification instruction is configured to cause the management controller device to modify operation of the server device component in the server device.

10. The IHS of claim 9, wherein the server device component operation modification instruction is configured to cause the management controller device to modify operation of at least one of:

a thermal control component that provides the server device component; or a power control component that provides the server device component.

11. The IHS of claim 8, wherein the at least one management operation includes:

receiving, from the proxy management controller manager subsystem, a server device management request;

identifying, using the formatted data and based on the server device management request, a server device management response; and transmitting, to the proxy management controller manager subsystem, the server device management response.

12. The IHS of claim 8, wherein the management controller device includes at least one service that is unavailable to perform the at least one management operation.

13. The IHS of claim 8, wherein the management controller device includes at least one service that is unavailable to convert the raw data to the formatted data.

14. A method for providing a proxy management controller, comprising:

receiving, by a first management controller device in a first server device from a proxy management controller manager subsystem, an instruction to provide a proxy management controller for the second management controller device in a second server device;

creating, by the first management controller device in response to receiving the instruction to provide the proxy management controller for the second management controller device, a proxy management controller virtual container that is associated with the second management controller device;

receiving, by the first management controller device from the second management controller device, raw data that was generated by the second server device based on its operation and collected by the second management controller device from the second server device;

storing, by the first management controller device, the raw data in the proxy management controller virtual container;

converting, by the first management controller device, the raw data that is stored in the proxy management controller virtual container to formatted data; and providing, by the first management controller device, the proxy management controller for the second management controller device by using the formatted data to perform at least one proxy management operation for the second management controller device that is unavailable and that would otherwise perform the at least one management operation absent its unavailability.

15. The method of claim 14, wherein the at least one management operation includes:

identifying, by the first management controller device based on the formatted data, a second server device component operation modification for a second server device component in the second server device; and transmitting, by the first management controller device, a second server device component operation modification instruction to the second management controller device, wherein the second server device component operation modification instruction is configured to cause the second management controller device to modify operation of the second server device component in the second server device.

16. The method of claim 15, wherein the second server device component operation modification instruction is configured to cause the second management controller device to modify operation of at least one of:

a thermal control component that provides the second server device component; or a power control component that provides the second server device component.

17. The method of claim 14, wherein the at least one management operation includes:

receiving, by the first management controller device from the proxy management controller manager subsystem, a second server device management request;

identifying, by the first management controller device using the formatted data and based on the second server device management request, a second server device management response; and transmitting, by the first management controller device to the proxy management controller manager subsystem, the second server device management response.

18. The method of claim 14, wherein the second management controller device includes at least one service that is unavailable to perform the at least one management operation.

19. The method of claim 14, wherein the second management controller device includes at least one service that is unavailable to convert the raw data to the formatted data.

20. The method of claim 14, further comprising:

transmitting, by the proxy management controller manager subsystem to the first management controller device, the instruction to provide the proxy management controller for the second management controller device in response to determining that at least one service that enables the at least one management operation and that is provided by the second management controller device has become unavailable.

\* \* \* \* \*

UNITED STATES PATENT AND TRADEMARK OFFICE
CERTIFICATE OF CORRECTION

PATENT NO. : 11,496,595 B2
APPLICATION NO. : 17/165026
DATED : November 8, 2022
INVENTOR(S) : Paulraj et al.

It is certified that error appears in the above-identified patent and that said Letters Patent is hereby corrected as shown below:

In the Specification

Column 3, Line 34, "FIG. 100" should be changed to --FIG. 10C--

In the Claims

Claim 3, Column 20, Lines 26-27, "one second hardware processor system" should be changed to --one second hardware processor--

Signed and Sealed this
Seventh Day of March, 2023

Katherine Kelly Vidal
*Director of the United States Patent and Trademark Office*